US012189457B2

(12) United States Patent
Pillilli et al.

(10) Patent No.: US 12,189,457 B2
(45) Date of Patent: Jan. 7, 2025

(54) REDUCING LATENCY OF CHANGING AN OPERATING STATE OF A PROCESSOR FROM A LOW-POWER STATE TO A NORMAL-POWER STATE

(71) Applicant: Microsoft Technology Licensing, LLC, Redmond, WA (US)

(72) Inventors: Bharat Srinivas Pillilli, El Dorado Hills, CA (US); Bryan David Kelly, Carnation, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 99 days.

(21) Appl. No.: 17/727,685

(22) Filed: Apr. 22, 2022

(65) Prior Publication Data

US 2023/0341924 A1 Oct. 26, 2023

(51) Int. Cl.
 *G06F 1/3293* (2019.01)
 *G06F 1/324* (2019.01)
 *G06F 9/30* (2018.01)
 *G06F 9/38* (2018.01)

(52) U.S. Cl.
 CPC ............ *G06F 1/3293* (2013.01); *G06F 1/324* (2013.01); *G06F 9/30029* (2013.01); *G06F 9/3871* (2013.01)

(58) Field of Classification Search
 CPC .... G06F 1/3293; G06F 1/324; G06F 9/30029; G06F 9/3871; G06F 2213/0026; G06F 1/3243; G06F 1/3253; G06F 1/3296; G06F 1/3209; H04W 52/0229; H04W 52/028
See application file for complete search history.

(56) References Cited

U.S. PATENT DOCUMENTS

| 5,694,574 | A | * | 12/1997 | Abramson | ............ | G06F 9/3858 |
| | | | | | | 711/E12.051 |
| 2002/0162038 | A1 | * | 10/2002 | Bullman | ................. | H04L 12/12 |
| | | | | | | 713/323 |
| 2009/0319810 | A1 | * | 12/2009 | Aoyama | ................. | H04L 12/10 |
| | | | | | | 713/300 |
| 2019/0102326 | A1 | * | 4/2019 | Agarwal | ............ | G06F 13/4282 |
| 2021/0132676 | A1 | * | 5/2021 | Mostafa | ................. | G06F 1/3293 |

FOREIGN PATENT DOCUMENTS

EP    3343382 A1    7/2018

OTHER PUBLICATIONS

"International Search Report and Written Opinion issued in PCT Application No. PCT/US2023/012456", Mailed Date: Jun. 2, 2023, 10 Pages.

* cited by examiner

*Primary Examiner* — Phil K Nguyen
*Assistant Examiner* — Brian J Corcoran
(74) *Attorney, Agent, or Firm* — Wade IP Law PLLC

(57) ABSTRACT

Techniques are described herein that are capable of reducing latency of changing an operating state of a processor from a low-power state to a normal-power state. For example, providing a notification from a hardware system to the processor or receiving the notification at the processor, indicating that a transaction layer packet will be provided to the processor at a future time, may trigger the processor to change the operating state from the low-power state to the normal-power state. In another example, receipt of a transaction layer packet at the processor from a hardware system may trigger the processor to change the operating state from the low-power state to the normal-power state.

20 Claims, 11 Drawing Sheets

REDUCING LATENCY OF CHANGING AN OPERATING STATE OF A PROCESSOR FROM A LOW-POWER STATE TO A NORMAL-POWER STATE

BACKGROUND

Processors, such as central processing units (CPUs) that are incorporated into system on a chip (SoC) circuits, often implement power saving features to place the processors in a low-power state under certain conditions, thereby reducing the amount of power that is consumed by the processors. Examples of such power saving features include frequency scaling and C-states. Frequency scaling enables a processor to operate at a relatively lower frequency when utilization of the processor is relatively low and at a relatively higher frequency when utilization of the processor is relatively high.

C-states are predefined power modes that control the amount of power that is consumed by a processor. For instance, in a C0 (a.k.a. "operating") state, the processor is fully turned on. In a C1 (a.k.a. "halt") state, the main internal clocks of the processor are stopped via software. In a C1E (a.k.a. "enhanced halt") state, the main internal clocks of the processor are stopped via software, and the operating voltage of the processor is reduced. In a C2 (a.k.a. "stop grant") state, the main internal clocks of the processor are stopped via hardware. In a C3 (a.k.a. "sleep") state, all internal clocks of the processor are stopped. Other C-states have been defined to provide additional levels of power saving.

However, if the aforementioned power saving features are utilized, a delay traditionally occurs when the processors are brought out of the low-power state, which compromises the performance of the processors. For instance, when frequency scaling is used, a utilization threshold that triggers an exit from the low-power state may not be reached, or a delay in reaching the utilization threshold may occur. When C-states are used, a transition from one C-state to another C-state may be delayed. One common technique to avoid the delay in bringing the processors out of the low-power state is to not use the power saving features (e.g., by disarming or disabling the power saving features). However, not utilizing the power saving features leads to a greater power consumption by the processors.

SUMMARY

Various approaches are described herein for, among other things, reducing latency of changing an operating state of a processor from a low-power state to a normal-power state. The low-power state is configured to cause the processor to consume a first amount of power. For instance, low-power state may be achieved by reducing a frequency at which the processor operates, reducing a voltage domain of the processor, and/or turning off components of the processor. The normal-power state is configured to cause the processor to consume a second amount of power that is greater than the first amount. For instance, the normal-power state may be achieved by increasing the frequency at which the processor operates, increasing a voltage domain of the processor, and/or turning on components of the processor that were turned off during the low-power state.

A first example approach is implemented by hardware. In the first example approach, a network packet is received via a network. Based at least in part on receipt of the network packet, prior to a transaction layer packet that is based at least in part on the network packet being provided to a processor by the hardware, a change of an operating state of the processor from a low-power state to a normal-power state is triggered by asynchronously providing a notification to the processor at a first time instance. The notification indicates that the transaction layer packet is to be provided to the processor at a second time instance that temporally follows the first time instance. The low-power state is configured to cause the processor to consume a first amount of power. The normal-power state is configured to cause the processor to consume a second amount of power that is greater than the first amount. The transaction layer packet is caused to be processed in the normal-power state by providing the transaction layer packet to the processor at the second time instance.

A second example approach is implemented by a processor. In the second example approach, a notification is received from hardware at a first time instance. The notification indicates that a transaction layer packet, which is based at least in part on a network packet, is to be received by the processor from the hardware at a second time instance that temporally follows the first time instance. Based at least in part on receipt of the notification, an operating state of the processor is changed from a low-power state to a normal-power state. The low-power state is configured to cause the processor to consume a first amount of power. The normal-power state is configured to cause the processor to consume a second amount of power that is greater than the first amount. The transaction layer packet is received from the hardware at the second time instance. The transaction layer packet is processed in the normal-power state based at least in part on receipt of the transaction layer packet at the second time instance.

A third example approach is implemented by a processor. In the third example approach, a transaction layer packet, which is based at least in part on a network packet, is received from a hardware system. Based at least in part on receipt of the transaction layer packet and without taking into consideration an extent to which the processor is utilized, a change of an operating state of the processor from a low-power state to a normal-power state is triggered. The low-power state is configured to cause the processor to consume a first amount of power. The normal-power state is configured to cause the processor to consume a second amount of power that is greater than the first amount. The transaction layer packet is processed in the normal-power state.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Moreover, it is noted that the invention is not limited to the specific embodiments described in the Detailed Description and/or other sections of this document. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the present invention and, together with the description, further serve to explain the principles involved and to enable a person skilled in the relevant art(s) to make and use the disclosed technologies.

Figure 1:
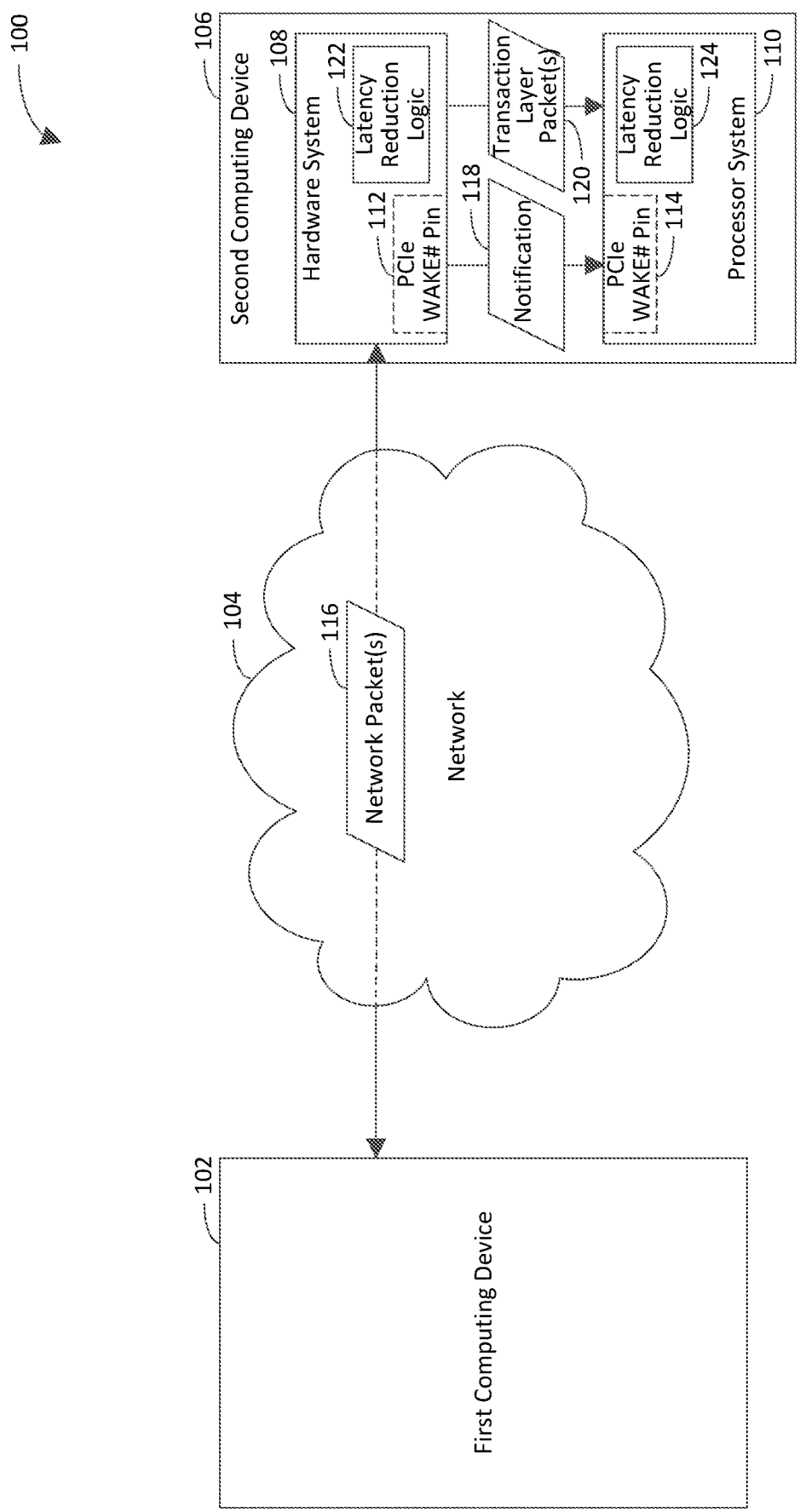
FIG. 1 is a block diagram of an example latency reduction system in accordance with an embodiment.

The features and advantages of the disclosed technologies will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the relevant art(s) to implement such feature, structure, or characteristic in connection with other embodiments whether or not explicitly described.

Descriptors such as "first", "second", "third", etc. are used to reference some elements discussed herein. Such descriptors are used to facilitate the discussion of the example embodiments and do not indicate a required order of the referenced elements, unless an affirmative statement is made herein that such an order is required.

II. Example Embodiments

Example embodiments described herein are capable of reducing latency of changing an operating state of a processor from a low-power state to a normal-power state. The low-power state is configured to cause the processor to consume a first amount of power. For instance, low-power state may be achieved by reducing a frequency at which the processor operates, reducing a voltage domain of the processor, and/or turning off components of the processor. The normal-power state is configured to cause the processor to consume a second amount of power that is greater than the first amount. For instance, the normal-power state may be achieved by increasing the frequency at which the processor operates, increasing a voltage domain of the processor, and/or turning on components of the processor that were turned off during the low-power state.

Example techniques described herein have a variety of benefits as compared to conventional techniques for bringing a processor out of a low-power state. For instance, the example techniques may be capable of reducing a latency associated with bringing the processor out of the low-power state. The example techniques may be capable of reducing an amount of power consumed by the processor while reducing the latency. In a first example, a notification (e.g., a hint) may be provided to the processor to exit a power saving mode, which may enable the processor to transition to a normal-power mode before latency-sensitive traffic enters the processor. For instance, arrival of a network packet at a serializer/de-serializer (SerDes) of a hardware component may trigger the hardware component to provide the notification to the processor. Even if the network packet is directed to only internal functions of the hardware component, arrival of the network packet at the hardware component may trigger the hardware component to provide the notification to the processor. In a second example, the processor may exit the low-power state immediately upon receipt of a packet and/or without taking into consideration how much the processor is being utilized. By reducing the latency, the example techniques may increase efficiency of the processor and/or a computing system that includes the processor.

The example techniques may reduce an amount of time and/or resources (e.g., processor cycles, memory, network bandwidth) that is consumed to change an operating state of a processor from a low-power state to a normal-power state. For example, by providing a notification (e.g., a hint) to the processor (or receiving the notification by the processor), indicating that a transaction layer packet subsequently will be provided to the processor, the example techniques may enable the processor to avoid consuming the time and resources that would have been consumed to change the operating state of the processor after the transaction layer packet is received by the processor. For instance, providing the notification to the processor (or receiving the notification by the processor) may enable the processor to change its state from the low-power state to the normal-power state prior to the transaction layer packet being received by the processor. In another example, by changing the operating state of the processor from the low-power state to the normal-power state immediately upon receipt of a transaction layer packet by the processor and/or without taking into consideration how much the processor is being utilized, the example techniques may enable the processor to avoid consuming the time and resources that would have been consumed to change the operating state of the processor during a delay associated with the conventional techniques (e.g., while waiting for a utilization threshold to be reached or while waiting for a transition from one C-state to another C-state to occur).

FIG. 1 is a block diagram of an example latency reduction system 100 in accordance with an embodiment. Generally speaking, the latency reduction system 100 operates to provide information between a first computing system 102 and a second computing system 106. For instance, the latency reduction system 100 may provide information to a user of the first computing device 102 in response to requests (e.g., hypertext transfer protocol (HTTP) requests) that are received from the user. The information may include documents (Web pages, images, audio files, video files, etc.), output of executables, and/or any other suitable type of information. The information is included in network packet(s) 116. In accordance with example embodiments described herein, the latency reduction system 100 reduces latency of changing an operating state of a processor (e.g., processor system 110) from a low-power state to a normal-power state. Detail regarding techniques for reducing latency of changing an operating state of a processor from a low-power state to a normal-power state is provided in the following discussion.

As shown in FIG. 1, the latency reduction system 100 includes the first computing device 102, a network 104, and a second computing device 106. Communication between the first computing device 102 and the second computing device 106 is carried out over the network 104 using well-known network communication protocols. The network 104 is a packet-switched network. For instance, the network 104 may be a wide-area network (e.g., the Internet), a local area network (LAN), another type of network, or a combination thereof.

The first computing device 102 is a processing system that is capable of communicating with the second computing system 106. An example of a processing system is a system that includes at least one processor that is capable of manipulating data in accordance with a set of instructions. For instance, a processing system may be a computer, a personal digital assistant, etc. The first computing device 102 is configured to provide requests to the second computing device 106 for requesting information stored on (or otherwise accessible via) the second computing device 106. For instance, a user may initiate a request for executing a computer program (e.g., an application) using a client (e.g., a Web browser, Web crawler, or other type of client) deployed on the first computing device 102 that is owned by or otherwise accessible to the user. In accordance with some example embodiments, the first computing device 102 is capable of accessing domains (e.g., Web sites) hosted by the second computing device 106, so that the first computing device 102 may access information that is available via the domains. Such domain may include Web pages, which may be provided as hypertext markup language (HTML) documents and objects (e.g., files) that are linked therein, for example.

The first computing device 102 may include any client-enabled system or device, including but not limited to a desktop computer, a laptop computer, a tablet computer, a wearable computer such as a smart watch or a head-mounted computer, a personal digital assistant, a cellular telephone, an Internet of things (IoT) device, or the like.

The second computing device 106 is a processing system that is capable of communicating with the first computing device 102. The second computing device 106 is configured to provide information to a user of the first computing device 102 in response to receiving requests from the user. For instance, the second computing device 106 may execute computer program(s) that provide the information. The information may include documents (Web pages, images, audio files, video files, etc.), output of executables, or any other suitable type of information. Any one or more of the computer programs may be a cloud computing service. A cloud computing service is a service that executes at least in part in the cloud. The cloud may be a remote cloud, an on-premises cloud, or a hybrid cloud. It will be recognized that an on-premises cloud may use remote cloud services. Examples of a cloud computing service include but are not limited to Microsoft 365® (or Excel® or Word™ therein) developed and distributed by Microsoft Corporation, Google Docs Editors™ (or Google Sheets™ or Google Docs™ therein) developed and distributed by Google Inc., and iWork® (or Numbers™ or Pages™ therein) developed and distributed by Apple Inc. In accordance with some example embodiments, the second computing device 106 is configured to host Web site(s), so that the Web site(s) are accessible to a user of the first computing device 102.

The second computing device 106 is shown to include a hardware system 108 and a processor system 110. The hardware system 108 is a system that includes hardware and that is configured to generate transaction layer packet(s) 120 based on receipt of network packet(s) 116. For instance, the hardware system 108 may convert the network packet(s) 116 into the transaction layer packet(s) 120. A network packet is a packet that is received via a packet-switched network. For instance, the network packet may be configured in accordance with the network layer (i.e., layer 3) of the Open Systems Interconnection (ISO) model. A transaction layer packet is a packet that is configured in accordance with a bus standard. Examples of a bus standard include but are not limited to the Peripheral Component Interconnect™ (PCI™) bus standard and the Accelerated Graphics Port™ (AGP™) bus standard, each of which was developed by Intel Corporation; the PCI eXtended™ (PCI-X®) bus standard, which was developed jointly by International Business Machines Corporation (IBM), HP Inc., and Compaq Computer Corporation; and the PCI Express™ (PCIe®) bus standard, which was developed jointly by Intel Corporation, Dell Inc., HP Inc., and IBM. The transaction layer packet may be further configured in accordance with a Compute Express Link (CXL) open standard, which was developed primarily by Intel Corporation, though the example embodiments are not limited in this respect. In an example, the transaction layer packet may include an interrupt. For instance, the interrupt may request that the processor system 110 provide data to the hardware system 108. In another example, the transaction layer packet may include an instruction to read data from a store and/or to write data to a store.

The hardware system 108 includes latency reduction logic 122. The latency reduction logic 122 is configured to reduce latency of changing an operating state of the processor system 110 from a low-power state to a normal-power state. In an example implementation, the latency reduction logic 122 receives the network packet(s) 116 via the network 104. Based at least in part on receipt of the network packet(s) 116, prior to transaction layer packet(s) 120 that are based at least in part on the network packet(s) 116 being provided to the processor system 110 by the latency reduction logic 122, the latency reduction logic 122 triggers a change of an operating state of the processor system 110 from a low-power state to a normal-power state by asynchronously providing a notification 118 to the processor system 110 at a first time instance. The notification 118 indicates that the transaction layer packet(s) 120 are to be provided to the processor system 110 at a second time instance that temporally follows the first time instance. The low-power state is configured to cause the processor system 110 to consume a first amount of power. The normal-power state is configured to cause the processor system 110 to consume a second amount of power that is greater than the first amount. The latency reduction logic 122 causes the transaction layer packet(s) 120 to be processed in the normal-power state by providing the transaction layer packet(s) 120 to the processor system 110 at the second time instance.

The hardware system 108 includes a PCIe WAKE #pin 112 via which the latency reduction logic 122 may provide the notification 118 to the processor system 110. For instance, the latency reduction logic 122 may provide the notification 118 to the processor system 110 via an out-of-band connection (i.e., via a connection that is different from the connection via which the latency reduction logic 122 provides the transaction layer packet(s) 120 to the processor system 110).

The processor system 110 is a system that includes at least one processor and that is configured to process transaction layer packets (e.g., the transaction layer packet(s) 120 that are received from the hardware system 108).

The processor system 110 includes latency reduction logic 124. The latency reduction logic 124 is configured to reduce latency of changing the operating state of the processor system 110 from the low-power state to the normal-power state. In a first example implementation, the latency reduction logic 124 receives the notification 118 from the hardware system 108 at a first time instance. In accordance with this implementation, the notification indicates that the transaction layer packet(s) 120, which are based at least in part on the network packet(s) 116, are to be received by the processor system 110 from the hardware system 108 at a second time instance that temporally follows the first time instance. Based at least in part on receipt of the notification 118, the operating state of the processor system 110 is changed from the low-power state to the normal-power state. The low-power state is configured to cause the processor system 110 to consume a first amount of power. The normal-power state is configured to cause the processor system 110 to consume a second amount of power that is greater than the first amount. If the processor system 110 is already in the normal-power state at the first time instance, the latency reduction logic 124 may ignore the notification 118. The latency reduction logic 124 receives the transaction layer packet(s) 120 from the hardware system 108 at the second time instance. The latency reduction logic 124 processes the transaction layer packet(s) 120 in the normal-power state based at least in part on receipt of the transaction layer packet(s) 120 at the second time instance.

In a second example implementation, the latency reduction logic 124 receives the transaction layer packet(s) 120, which are based at least in part on the network packet(s) 116, from the hardware system 108. Based at least in part on receipt of the transaction layer packet(s) 120 and without taking into consideration an extent to which the processor system 110 is utilized, the latency reduction logic 124 triggers a change of the operating state of the processor system 110 from the low-power state to the normal-power state. The low-power state is configured to cause the processor system 110 to consume a first amount of power. The normal-power state is configured to cause the processor system 110 to consume a second amount of power that is greater than the first amount. The latency reduction logic 124 processes the transaction layer packet(s) 120 in the normal-power state.

The processor system 110 includes a PCIe WAKE #pin 114 via which the latency reduction logic 124 may receive the notification 118 from the hardware system 108. For instance, the latency reduction logic 124 may receive the notification 118 from the hardware system 108 via an out-of-band connection (i.e., via a connection that is different from the connection via which the latency reduction logic 124 receives the transaction layer packet(s) 120 from the hardware system 108). It will be recognized that each of the PCIe WAKE #pin 112 and the PCIe WAKE #pin 114 may be a PCIe-compliant general-purpose input/output (GPIO) pin.

The latency reduction logic 122 and/or the latency reduction logic 124 may be implemented in various ways to reduce latency of changing the operating state of the processor system 110 from the low-power state to the normal-power state, including being implemented in hardware, software, firmware, or any combination thereof. For example, the latency reduction logic 122 and/or the latency reduction logic 124 may be implemented as computer program code configured to be executed in one or more processors. In another example, at least a portion of the latency reduction logic 122 and/or the latency reduction logic 124 may be implemented as hardware logic/electrical circuitry. For instance, at least a portion of the latency reduction logic 122 and/or the latency reduction logic 124 may be implemented in a field-programmable gate array (FPGA), an application-specific integrated circuit (ASIC), an application-specific standard product (ASSP), a system-on-a-chip system (SoC), a complex programmable logic device (CPLD), etc. Each SoC may include an integrated circuit chip that includes one or more of a processor (a microcontroller, microprocessor, digital signal processor (DSP), etc.), memory, one or more communication interfaces, and/or further circuits and/or embedded firmware to perform its functions.

It will be recognized that the hardware system 108 need not necessarily include the PCIe WAKE #pin 112 and/or the latency reduction logic 122. Furthermore, the hardware system 108 may include components in addition to or in lieu of the PCIe WAKE #pin 112 and/or the latency reduction logic 122. It will be further recognized that the processor system 110 need not necessarily include the PCIe WAKE #pin 114 and/or the latency reduction logic 124. Furthermore, the processor system 110 may include components in addition to or in lieu of the PCIe WAKE #pin 114 and/or the latency reduction logic 124.

Figure 2:
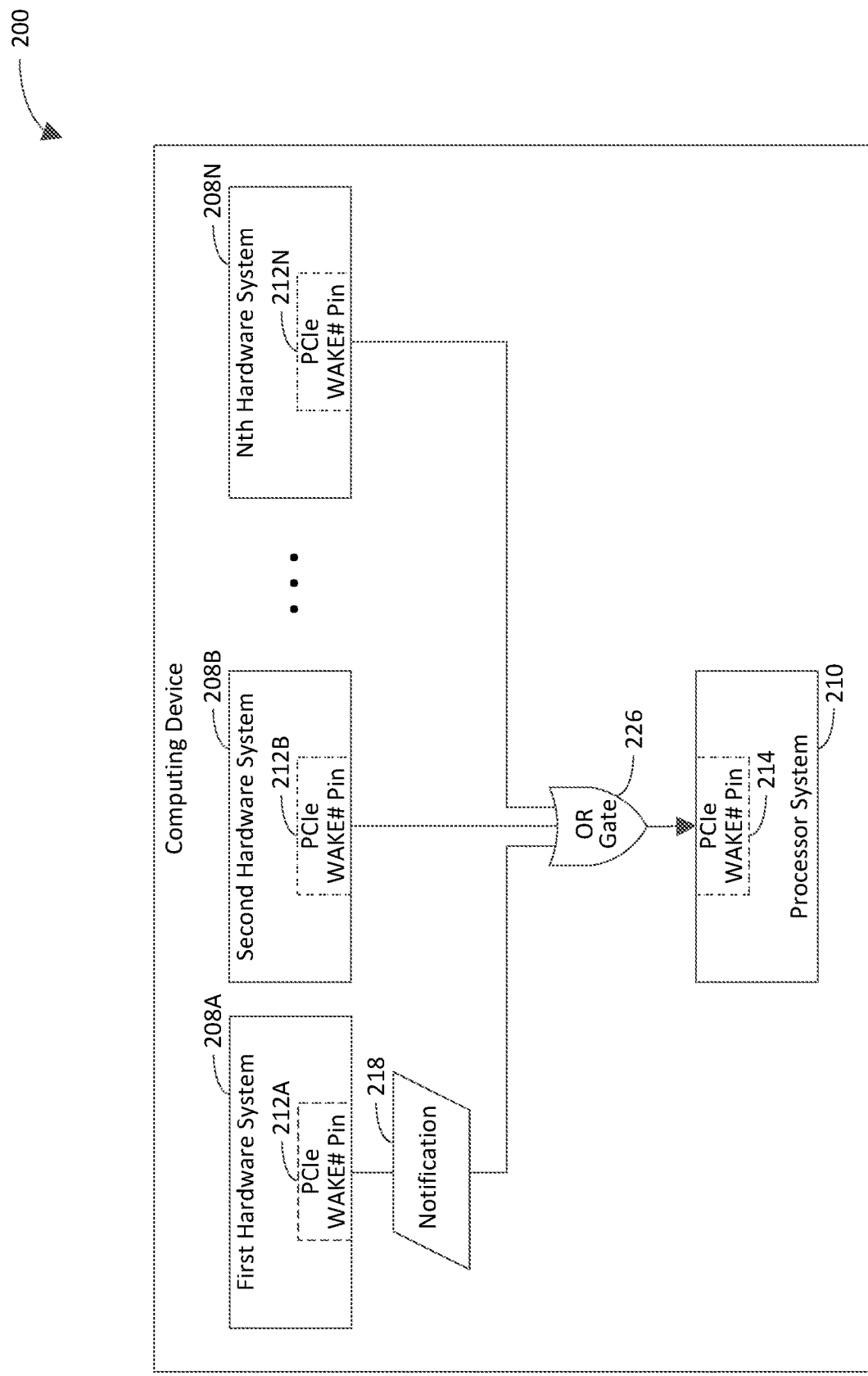
FIG. 2 is a block diagram of an example implementation of the second computing device shown in FIG. 1 in accordance with an embodiment.

FIG. 2 is a block diagram of a computing device 200, which is an example implementation of the second computing device 106 shown in FIG. 1, in accordance with an embodiment. As shown in FIG. 2, the computing device 200 includes a plurality of hardware systems 208A-208N, a Boolean OR gate 226, and a processor system 210. Each of the hardware systems 208A-208N is configured to operate in a manner similar to the hardware system 108 shown in FIG. 1. For instance, the first hardware system 208A may receive and process a first portion of the packet(s) 116; the second hardware system 208B may receive and process a second portion of the packet(s) 116 that is different from the first portion, and so on. Each of the hardware systems 208A-208N is configured to provide a notification to the processor system 210 upon receipt of a network packet. The first hardware system 208A is shown to generate a notification 218 to indicate that the first hardware system 208A has received a network packet. Each of the hardware systems 208A-208N may be a PCIe-compliant device and/or may operate in accordance with a Non-Volatile Memory Express (NVMe) open logical-device interface specification, which was developed by Intel Corporation, though the example embodiments are not limited in this respect.

The hardware systems 208A-208N are shown to include respective PCIe WAKE #pins 212A-212N for illustrative purposes. For instance, the hardware systems 208A-208N may send their notifications to the processor system 210 via the respective PCIe WAKE #pins 212A-212N.

The Boolean OR gate 226 is configured to perform a Boolean OR operation on the outputs of the hardware systems 208A-208N. The Boolean OR gate 226 forwards a notification that is received from any of the hardware systems 208A-208N to the processor system 210 such that a notification from any of the hardware systems 208A-208N triggers the processor system 210 to change its operating system from a low-power state to a normal-power state.

The processor system 210 is configured to operate in a manner similar to the processor system 110 shown in FIG. 1. For instance, based at least in part on receipt of a notification (e.g., notification 218) from any of the hardware systems 208A-208N via the Boolean OR gate 226, the processor system 210 changes its operating state from the low-power state to the normal-power state.

The processor system 210 is shown to include a PCIe WAKE #pin 214 for illustrative purposes. For instance, the processor system 210 may receive notifications from the Boolean OR gate 226 via the PCIe WAKE #pin 214.

Figure 3:
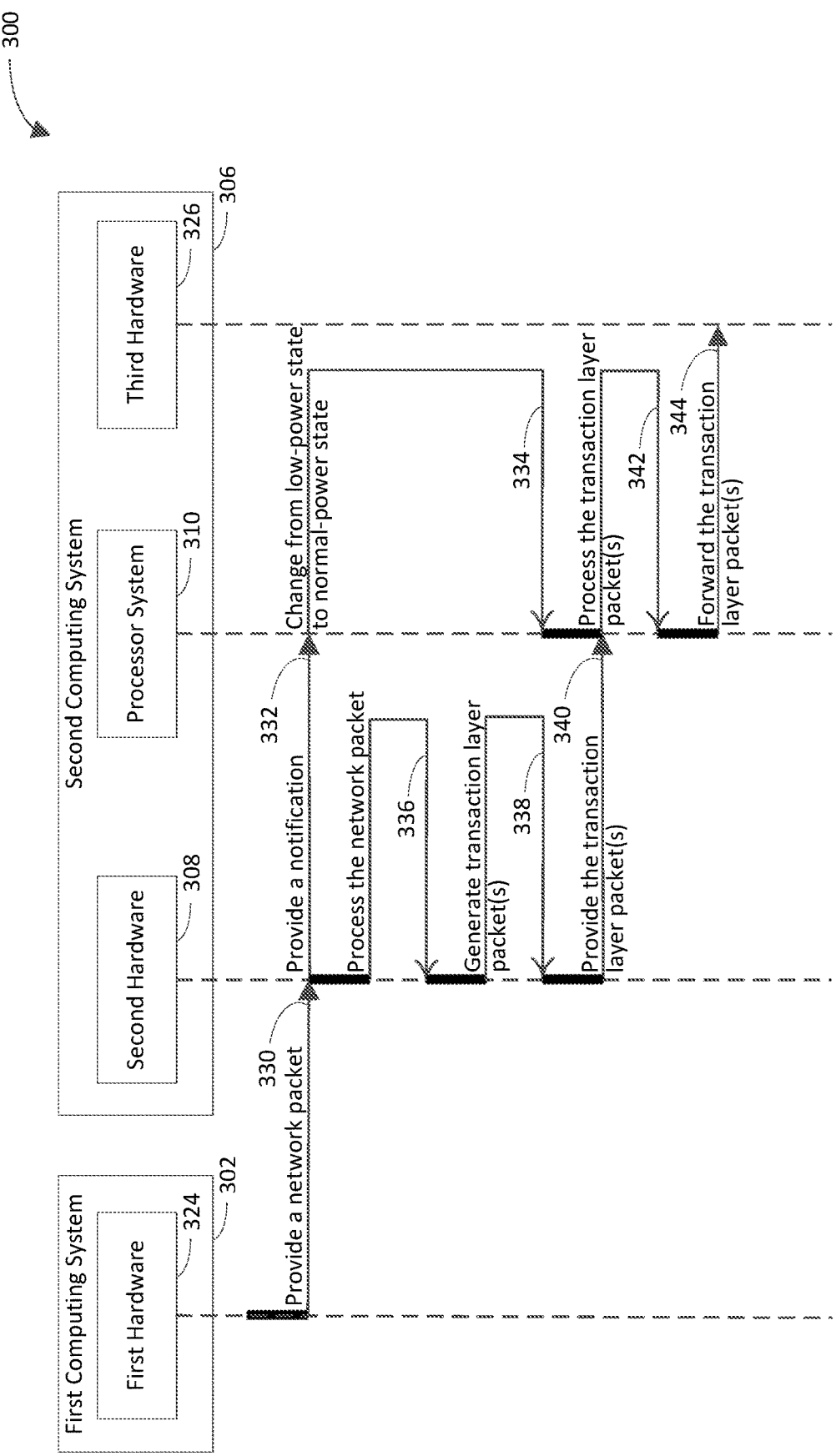
FIG. 3 is an example activity diagram for reducing latency of changing an operating state of a processor from a low-power state to a normal-power state in accordance with an embodiment.

FIG. 3 is an example activity diagram 300 for reducing latency of changing an operating state of a processor system 310 from a low-power state to a normal-power state in accordance with an embodiment. FIG. 3 depicts a first computing system 302 and a second computing system 306. The first computing system 302 includes first hardware 324. The second computing system 306 includes second hardware 308, the processor system 310, and third hardware 326. Activities 330, 332, 334, 336, 338, 340, 342, and 344 will now be described with reference to the first hardware 324, the second hardware 308, the processor system 310, and the third hardware 326.

In activity 330, the first hardware 324 provides a network packet to the second hardware 308.

In activity 332, the second hardware 308 provides a notification to the processor system 310 (e.g., based on receipt of the network packet in activity 330). The notification indicates that transaction layer packet(s) will be provided to the processor system 310 at a future (e.g., subsequent) time. By providing the notification to the processor system 310, the second hardware 308 may trigger the processor system 310 to change an operating state of the processor system 310 from a low-power state to a normal-power state. In the low-power state, the processor system 310 operates in a manner that consumes a relatively low amount of power. For instance, in the low-power state, selected portions of the functionality of the processor system 310 may be turned off, frequencies of clock signals of the processor system 310 may be reduced (e.g., an operating frequency of the processor system 310 may be reduced), and/or voltages that are used for clock signals of the processor system 310 may be reduced. In the normal-power state, the processor system 310 operates in a manner that consumes a relatively high amount of power. For instance, in the normal-power state, portions of the functionality of the processor system 310 that were turned off in the low-power state may be turned on, frequencies of clock signals of the processor system 310 may be increased (e.g., an operating frequency of the processor system 310 may be increased), and/or voltages that are used for clock signals of the processor system 310 may be increased.

In activity 334, the processor system 310 changes its state from the low-power state to the normal-power state based at least in part on receipt of the notification from the second hardware 308. The processor system 310 may ensure that its state is changed from the low-power state to the normal-power state on or before the future time. For example, the notification may specify the future time at which the transaction layer packet(s) will be provided to the processor system 310. In accordance with this example, the processor system 310 may schedule aspects of its functionality to be turned on, frequencies of clock signals to be increased, and/or voltages of clock signals to be increased at times early enough to ensure that the transition from the low-power state to the normal-power state is completed by the future time.

In activity 336, the second hardware 308 processes the network packet. For instance, the second hardware 308 may decrypt the network packet and/or decompress the network packet.

In activity 338, the second hardware 308 generates transaction layer packet(s) based on the network packet. For instance, the second hardware 308 may divide the network packet into portion(s) and format those portion(s) in accordance with a bus standard, such as the PCIe® bus standard, to generate the respective transaction layer packet(s). The second hardware 308 may perform any of a variety of operations on the transaction layer packet(s) in preparation for the transaction layer packet(s) to be sent to another entity, such as the third hardware 326. For instance, the second hardware 308 may encode the transaction layer packet(s) and/or encrypt the transaction layer packet(s).

In activity 340, the second hardware 308 provides the transaction layer packet(s) to the processor system 310. It will be recognized that the operating state of the processor system 310 may be changed from the low-power state to the normal-power state in activity 334 before the transaction layer packet(s) are received by the processor system 310 upon completion of activity 340. For instance, activity 334 may be completed while any one or more of the activities 336, 338, and/or 340 are being performed.

In activity 342, the processor system 310 processes the transaction layer packet(s). For instance, the processor system 310 may decrypt the transaction layer packet(s) and/or decode the transaction layer packet(s). Decoding each transaction layer packet may include identifying the header of the packet, the body of the packet, the prefix(es) of the packet, the suffix(es) of the packet, and so on.

In activity 344, the processor system 310 forwards the transaction their packet(s) to the third hardware 326. By forwarding the transaction layer packet(s) to the third hardware 326, the processor system 310 may enable the third hardware 326 to process the transaction layer packet(s). It will be recognized that the third hardware 326 and the second hardware 308 may be the same, though the example embodiments are not limited in this respect.

In some example embodiments, one or more of the activities 330, 332, 334, 336, 338, 340, 342, and/or 344 of the activity diagram 300 may not be performed. Moreover, activities in addition to or in lieu of the activities 330, 332, 334, 336, 338, 340, 342, and/or 344 may be performed.

Figure 4:
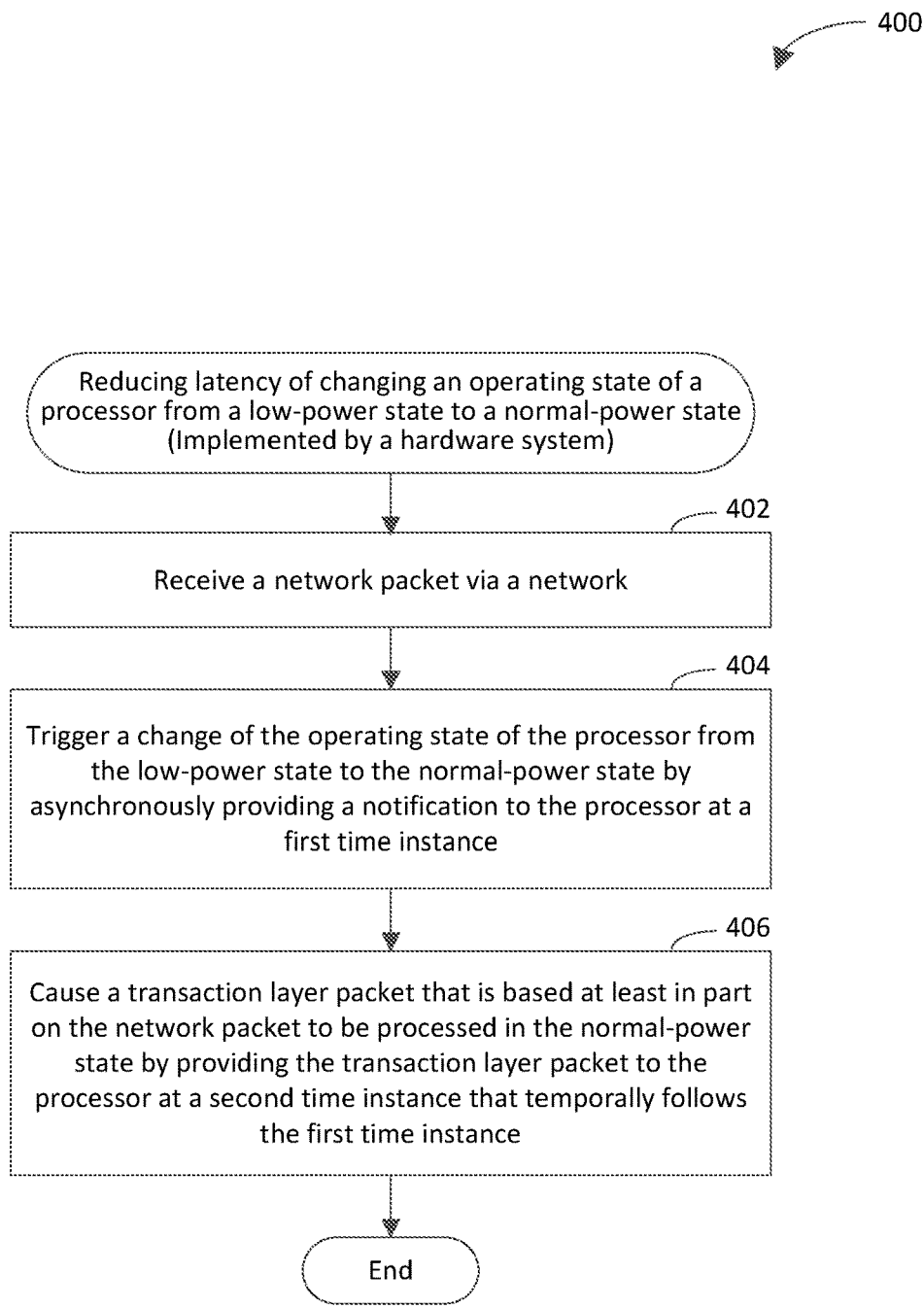
FIGS. 4 and 6 depict flowcharts of example methods for reducing latency of changing an operating state of a processor from a low-power state to a normal-power state in accordance with embodiments.
Figure 5:
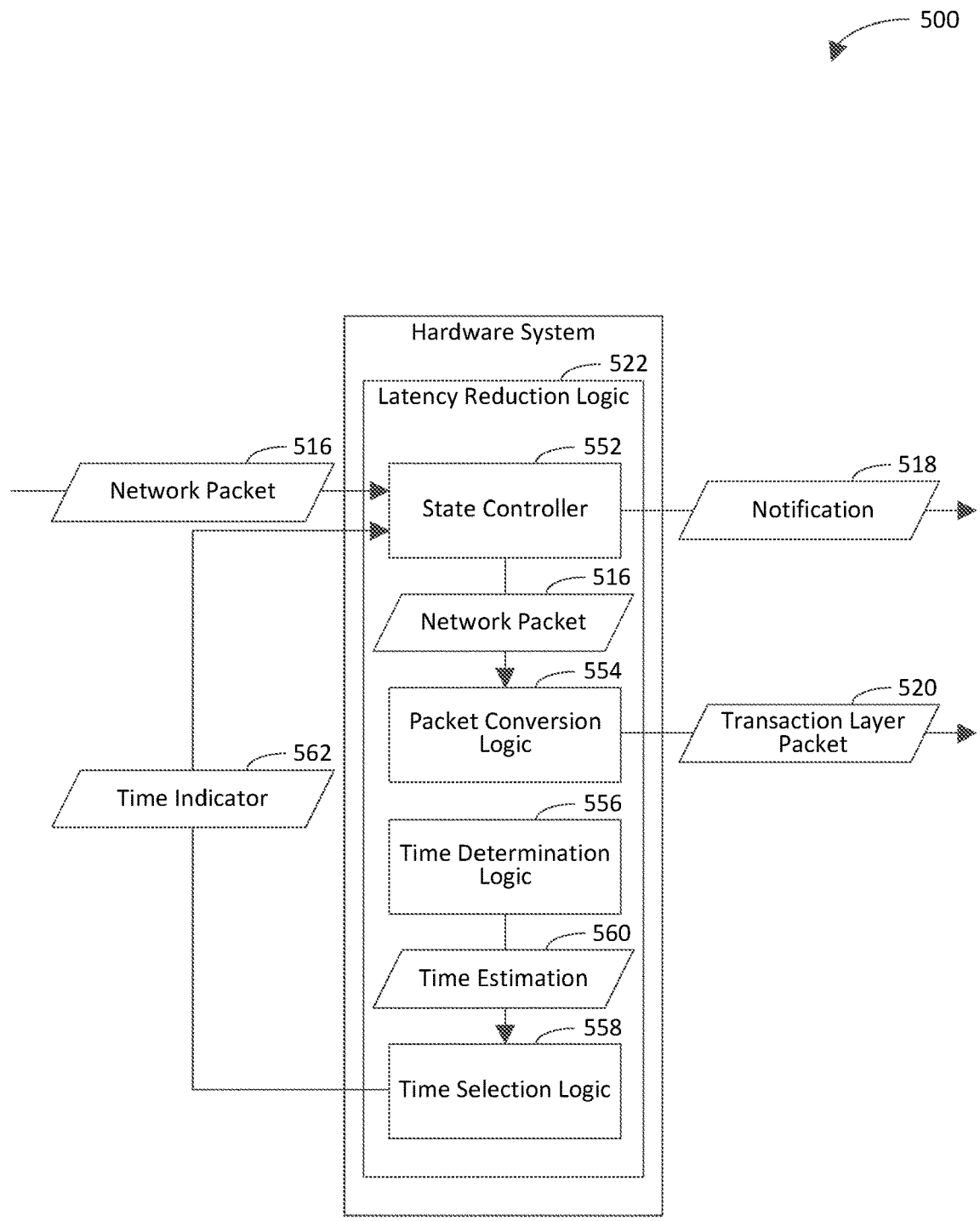
FIG. 5 is a block diagram of an example implementation of a hardware system shown in FIG. 1 in accordance with an embodiment.

FIG. 4 depicts a flowchart 400 of an example method for reducing latency of changing an operating state of a processor from a low-power state to a normal-power state in accordance with an embodiment. Flowchart 400 may be performed by the hardware system 108 shown in FIG. 1, for example. For illustrative purposes, flowchart 400 is described with respect to a hardware system 500 shown in FIG. 5, which is an example implementation of the hardware system 108. The hardware system 500 may be any suitable type of hardware system, including but not limited to a network interface controller (NIC), an accelerator, storage (e.g., memory, such as a solid-state drive (SSD)), or a graphical processing unit (GPU). As shown in FIG. 5, the hardware system 500 includes latency reduction logic 522. The latency reduction logic 522 includes a state controller 552, packet conversion logic 554, time determination logic 556, and time selection logic 558. Further structural and operational embodiments will be apparent to persons skilled in the relevant art(s) based on the discussion regarding flowchart 400.

As shown in FIG. 4, the method of flowchart 400 begins at step 402. In step 402, a network packet is received via a network. In an example implementation, the state controller 552 receives a network packet 516.

At step 404, a change of the operating state of the processor from the low-power state to the normal-power state is triggered by asynchronously providing a notification to the processor at a first time instance. The change of the operating state is triggered based at least in part on the network packet being received at step 402. The change of the operating state is triggered prior to a transaction layer packet that is based at least in part on the network packet being provided to the processor. For instance, the processor may be triggered to change the operating state of the processor in anticipation of the transaction layer packet being provided to the processor. The notification indicates that the transaction layer packet is to be provided to the processor at a second time instance that temporally follows the first time instance. The low-power state is configured to cause the processor to consume a first amount of power. The normal-power state is configured to cause the processor to consume a second amount of power that is greater than the first amount. In an example implementation, the state controller 552 triggers the change of the operating state of the processor by asynchronously providing a notification 518 to the processor at the first time instance. For instance, state controller 552 may trigger the change as a result of receiving the network packet 516. The notification 518 indicates that a transaction layer packet 520 is to be provided to the processor at the second time instance.

Triggering the change of the operating state of the processor at step 404 may reduce latency with regard to changing the state of the processor from the low-power state to the normal-power state. Triggering the change of the operating state of the processor at step 404 may increase efficiency of the processor and/or the computing system that includes the processor. Triggering the change of the operating state of the processor at step 404 may enable the processor to reduce power consumption without delaying an exit from the low-power state to the normal-power state.

In an example embodiment, the notification indicates an amount of time between the first time instance at which the notification is asynchronously provided to the processor and the second time instance at which the transaction layer packet is to be provided to the processor. For example, the notification may include a first time stamp that indicates the first time instance and a second time stamp that indicates the second time instance. In another example, the notification specifies a difference between the first time instance and the second time instance without including a first time stamp that indicates the first time instance and/or a second time stamp that indicates the second time instance.

In another example embodiment, triggering the change of the operating state of the processor at step 404 includes triggering the processor to increase a frequency at which the processor operates (i.e., the operating frequency) by asynchronously providing the notification to the processor at the first time instance. For example, the processor may be triggered to increase the operating frequency from a first frequency (e.g., 0.7 GHz) to a second frequency (e.g., 2.0 GHz) that is greater than the first frequency. In another example, increasing the operating frequency may include increasing a rate at which a clock that is used to perform operations by the processor operates (e.g., oscillates).

In yet another example embodiment, triggering the change of the operating state of the processor at step 404 includes triggering the processor to increase a voltage of a clock that is used to perform operations by the processor by asynchronously providing the notification to the processor at the first time instance. For instance, the processor may be triggered to increase the voltage of the clock from a first voltage to a second voltage that is greater than the first voltage.

In still another example embodiment, triggering the change of the operating state of the processor at step 404 includes triggering the processor to switch a portion of the processor from an off state to an on state by asynchronously providing the notification to the processor at the first time instance. For example, the processor may be triggered to turn on voltages that were turned off while the processor was in the low-power state. In another example, the processor may be triggered to reverse clock gating that was performed by the processor in the low-power state to turn the portion of the processor off. Clock gating is a power-saving technique that switches off circuit(s) and/or portion(s) thereof to reduce dynamic power consumption.

In another example embodiment, triggering the change of the operating state of the processor at step 404 includes asynchronously providing the notification to the processor via a Peripheral Component Internet Express (PCIe) WAKE #pin of the hardware system at the first time instance.

In yet another example embodiment, triggering the change of the operating state of the processor at step 404 includes, at the first time instance, asynchronously providing the notification to the processor via a first connection that is included in a plurality of connections that connect a plurality of respective hardware systems to the processor via a Boolean OR gate.

At step 406, the transaction layer packet, which is based at least in part on the network packet, is caused to be processed in the normal-power state by providing the transaction layer packet to the processor at the second time instance. For instance, the transaction layer packet may be provided to the processor via a PCIe connection. A PCI3 connection is a connection that operates in accordance with the PCIe® bus standard. In an example implementation, the packet conversion logic 54 causes the transaction layer packet 520 to be processed in the normal-power state by providing the transaction layer packet 520 to the processor at the second time instance. For instance, the state controller 552 may forward the network packet 516 to the packet conversion logic 554 to enable the packet conversion logic 554 to generate the transaction layer packet 520 based at least in part on the network packet 516. For example, the packet conversion logic 554 may convert the network packet 516 into one or more transaction layer packets, which include the transaction layer packet 520. In accordance with this example, the packet conversion logic 554 may process the network packet 516 (e.g., by decrypting and/or decompressing the network packet 516) prior to converting the network packet 516 into the one or more transaction layer packets. The packet conversion logic 554 may provide the transaction layer packet 520 to the processor in response to generating the transaction layer packet 520.

In some example embodiments, one or more steps 402, 404, and/or 406 of flowchart 400 may not be performed. Moreover, steps in addition to or in lieu of steps 402, 404, and/or 406 may be performed. For instance, in an example embodiment, the notification is asynchronously provided to the processor at step 404 prior to completion of processing of the network packet by the hardware system. The processing of the network packet includes generating the transaction layer packet based at least in part on the network packet. The processing of the network packet may include other types of processing, such as decrypting the network packet and/or decompressing the network packet, though the example embodiments are not limited in this respect.

In a first aspect of this embodiment, the method of flowchart 400 further includes determining an amount of time that is to be consumed to complete the processing of the network packet by the hardware system. In an example implementation, the time determination logic 556 determines the amount of time that is to be consumed to complete the processing of the network packet 516 by the packet conversion logic 554. For example, the time determination logic 556 may monitor how long the packet conversion logic 554 takes to complete processing of network packets. In accordance with this example, the time determination logic 556 may determine the amount of time that is to be consumed to complete the processing of the network packet 516 based on historical measurements indicating how long the packet conversion logic 554 has taken in the past to complete processing of the network packets. The time determination logic 556 may generate a time estimation 560 to indicate the amount of time that is to be consumed to complete the processing of the network packet 516 by the packet conversion logic 554. In accordance with the first aspect, the method of flowchart 400 further includes selecting the first time instance at which the notification is provided to the processor based at least in part on the amount of time. For instance, the first time instance may be selected based at least in part on a difference between the first time instance and the second time instance being equal to the amount of time that is to be consumed to complete the processing of the network packet by the hardware system. In an example implementation, the time selection logic 558 selects the first time instance based at least in part on the amount of time, as indicated by the time estimation 560. The time selection logic 558 may generate a time indicator 562 to indicate the first time instance, which may enable the state controller 552 to determine the first time instance at which to provide the notification 518 to the processor.

In a second aspect of this embodiment, the method of flowchart 400 further includes completing the processing of the network packet to generate the transaction layer packet. In an example implementation, the packet conversion logic 554 completes the processing of the network packet 516 to generate the transaction layer packet 520. In accordance with the second aspect, the transaction layer packet is provided to the processor at the second time instance based at least in part on the processing of the network packet being completed.

It will be recognized that the hardware system 500 may not include one or more of the state controller 552, the packet conversion logic 554, the time determination logic 556, and/or the time selection logic 558. Furthermore, the hardware system 500 may include components in addition to or in lieu of the state controller 552, the packet conversion logic 554, the time determination logic 556, and/or the time selection logic 558.

Figure 6:
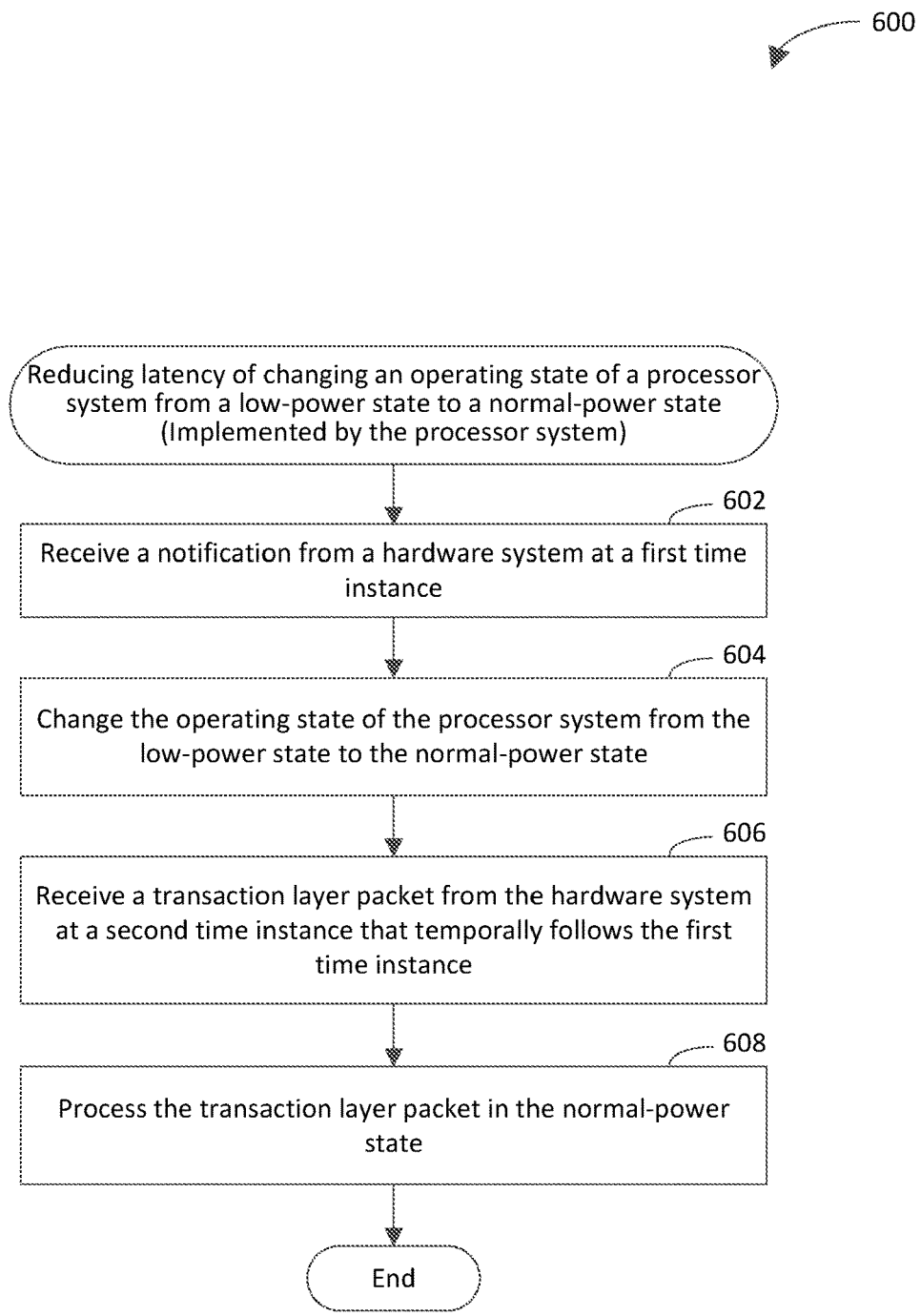
Figure 7:
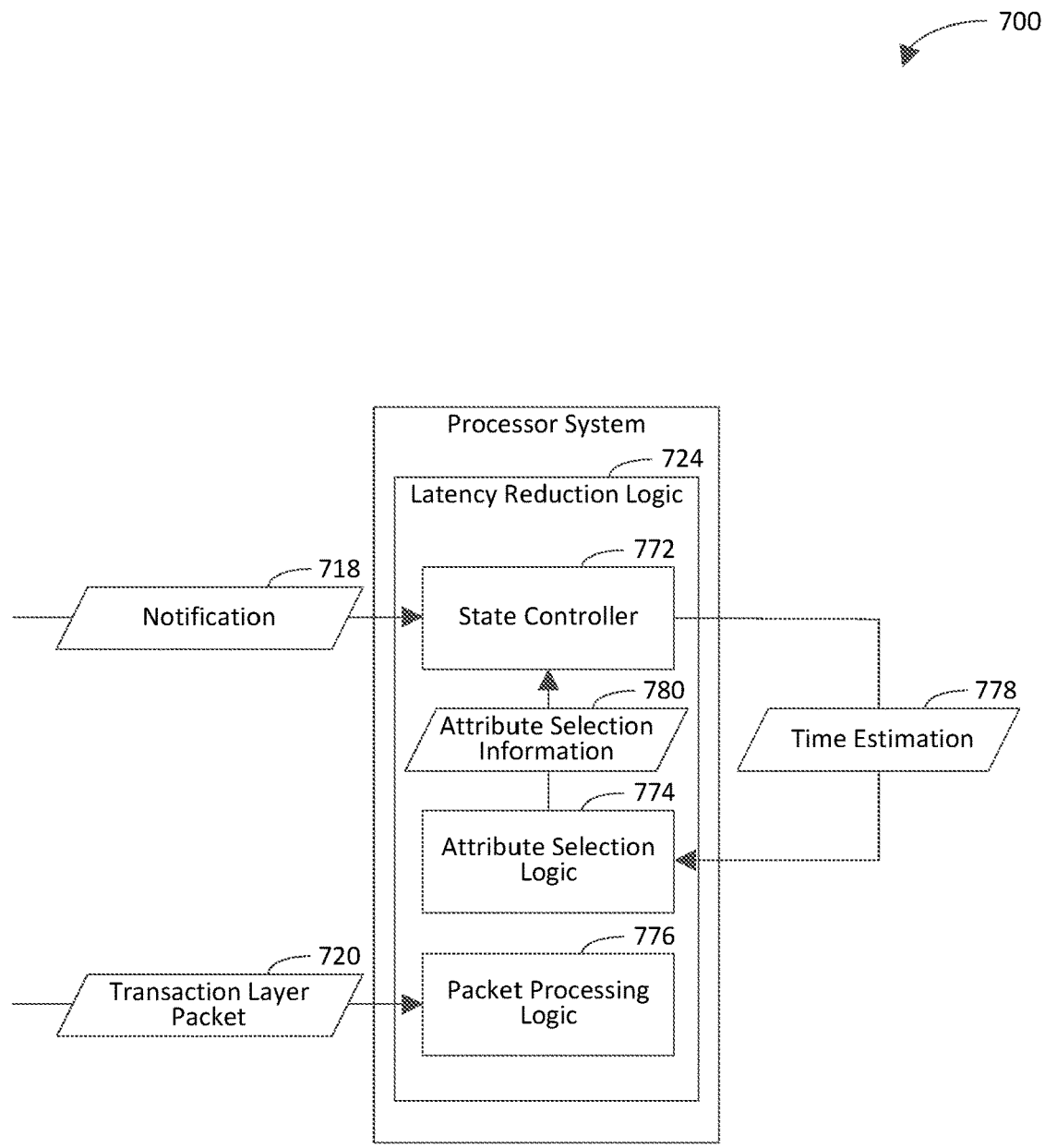
FIG. 7 is a block diagram of an example implementation of a processor system shown in FIG. 1 in accordance with an embodiment.

FIG. 6 depicts a flowchart 600 of another example method for reducing latency of changing an operating state of a processor system from a low-power state to a normal-power state in accordance with an embodiment. Flowchart 600 may be performed by the processor system 110 shown in FIG. 1, for example. For illustrative purposes, flowchart 600 is described with respect to a processor system 700 shown in FIG. 7, which is an example implementation of the processor system 110. As shown in FIG. 7, the processor system 700 includes latency reduction logic 724. The latency reduction logic 724 includes a state controller 772, attribute selection logic 774, and packet processing logic 776. Further structural and operational embodiments will be apparent to persons skilled in the relevant art(s) based on the discussion regarding flowchart 600.

As shown in FIG. 6, the method of flowchart 600 begins at step 602. In step 602, a notification is received from a hardware system at a first time instance. The notification indicates that a transaction layer packet, which is based at least in part on a network packet, is to be received by the processor system from a hardware system at a second time instance that temporally follows the first time instance. The hardware system may be any suitable type of hardware system, including but not limited to a network interface controller (NIC), an accelerator, storage (e.g., memory, such as a solid-state drive (SSD)), or a graphical processing unit (GPU). In an example implementation, the state controller 772 receives a notification 718 at the first time instance. The notification 718 indicates that a transaction layer packet 720, which is based at least in part on a network packet, is to be received by the processor system 700 from a hardware system at a second time instance that temporally follows the first time instance.

In an example implementation, the notification is received from the hardware system at step 602 via a Peripheral Component Internet Express (PCIe) WAKE #pin of the processor system at the first time instance.

In another example implementation, the notification is received from the hardware system at step 602 at the first time instance via a first connection that is included in a plurality of connections that connect a plurality of respective hardware systems to the processor system via a Boolean OR gate.

At step 604, the operating state of the processor system is changed from the low-power state to the normal-power state based at least in part on receipt of the notification. The low-power state is configured to cause the processor system to consume a first amount of power. The normal-power state is configured to cause the processor system to consume a second amount of power that is greater than the first amount. In an example implementation, the state controller 772 changes the operating state of the processor system 700 from the low-power state to the normal-power state based at least in part on receipt of the notification 718. The low-power state is configured to cause the processor system 700 to consume a first amount of power. The normal-power state is configured to cause the processor system 700 to consume a second amount of power that is greater than the first amount.

Receiving the notification at step 602 and/or changing the operating state of the processor system at step 604 may reduce latency with regard to changing the state of the processor system from the low-power state to the normal-power state. Receiving the notification at step 602 and/or changing the operating state of the processor system at step 604 may increase efficiency of the processor system and/or the computing system that includes the processor system. Receiving the notification at step 602 and/or changing the operating state of the processor system at step 604 may enable the processor system to reduce power consumption without delaying an exit from the low-power state to the normal-power state.

In an example embodiment, changing the operating state of the processor system at step 604 is performed before the transaction layer packet is received from the hardware system at the second time instance.

In another example embodiment, changing the operating state of the processor system at step 604 includes increasing a frequency at which the processor system operates, increasing a voltage of a clock that is used by the processor system to perform operations, and/or switching a portion of the processor system from an off state to an on state.

At step 606, the transaction layer packet is received from the hardware system at the second time instance. In an example implementation, the packet processing logic 776 receives the transaction layer packet 720 from the hardware system at the second time instance.

At step 608, the transaction layer packet is processed in the normal-power state (e.g., based at least in part on receipt of the transaction layer packet at the second time instance). For instance, processing the transaction layer packet may include decrypting the transaction layer packet and/or decoding the transaction layer packet. In an example implementation, the packet processing logic 776 processes the transaction layer packet 720 in the normal-power state based at least in part on receipt of the transaction layer packet 720 at the second time instance.

In an example embodiment, processing the transaction layer packet at step 608 includes instructing the hardware system to perform a designated task based at least in part on receipt of the transaction layer packet. For example, the designated task may include processing a designated image and displaying the designated image. In another example, the designated task may include processing a designated audio file and playing the designated audio file.

In some example embodiments, one or more steps 602, 604, 606, and/or 608 of flowchart 600 may not be performed. Moreover, steps in addition to or in lieu of steps 602, 604, 606, and/or 608 may be performed. For instance, in an example embodiment, the notification indicates an amount of time between the first time instance at which the notification is received by the processor system from the hardware system and the second time instance at which the transaction layer packet is to be received by the processor system from the hardware system. In accordance with this embodiment, the method of flowchart 600 further includes selecting an attribute of the processor system from a plurality of attributes of the processor system to be changed based at least in part on the processor system being capable of changing the attribute from a first value to a second value within the amount of time between the first time instance and the second time instance. In an example implementation, the attribute selection logic 774 selects an attribute of the processor system 700 to be changed from a plurality of attributes of the processor system 700. For instance, the state controller 772 may generate a time estimation 778, which indicates the amount of time between the first instance and the second instance. The attribute selection logic 774 may analyze the time estimation 778 to determine the amount of time. The attribute selection logic 774 may determine an amount of time that the processor system 700 consumes to change each of the plurality of attributes. The attribute selection logic 774 may further determine which of the plurality of attributes can be changed simultaneously. Based on the determined amount of time that the processor system 700 consumes to change each of the plurality of attributes and further based on which of the plurality of attributes can be changed simultaneously, the attribute selection logic 774 may determine which of the plurality of attributes the processor system 700 is capable of changing within the amount of time indicated by the time estimation 778. The attribute selection logic 774 may select the attribute of the processor system 700 to be changed from the attribute(s) the processor system 700 is capable of changing within the amount of time indicated by the time estimation 778. In further accordance with this embodiment, changing the operating state of the processor system at step 604 includes changing the selected attribute of the processor system from the first value to the second value.

In an aspect of this embodiment, selecting the attribute includes selecting a first subset of the plurality of attributes and not selecting a second subset of the plurality of attributes based at least in part on the processor system being capable of changing each attribute in the first subset from a respective first value to a respective second value within the amount of time between the first time instance and the second time instance. In accordance with this aspect, changing the operating state of the processor system at step 604 includes changing each attribute in the first subset from the respective first value to the respective second value.

It will be recognized that the processor system 700 may not include one or more of the state controller 772, the attribute selection logic 774, and/or the packet processing logic 776. Furthermore, the processor system 700 may include components in addition to or in lieu of the state controller 772, the attribute selection logic 774, and/or the packet processing logic 776.

Figure 8:
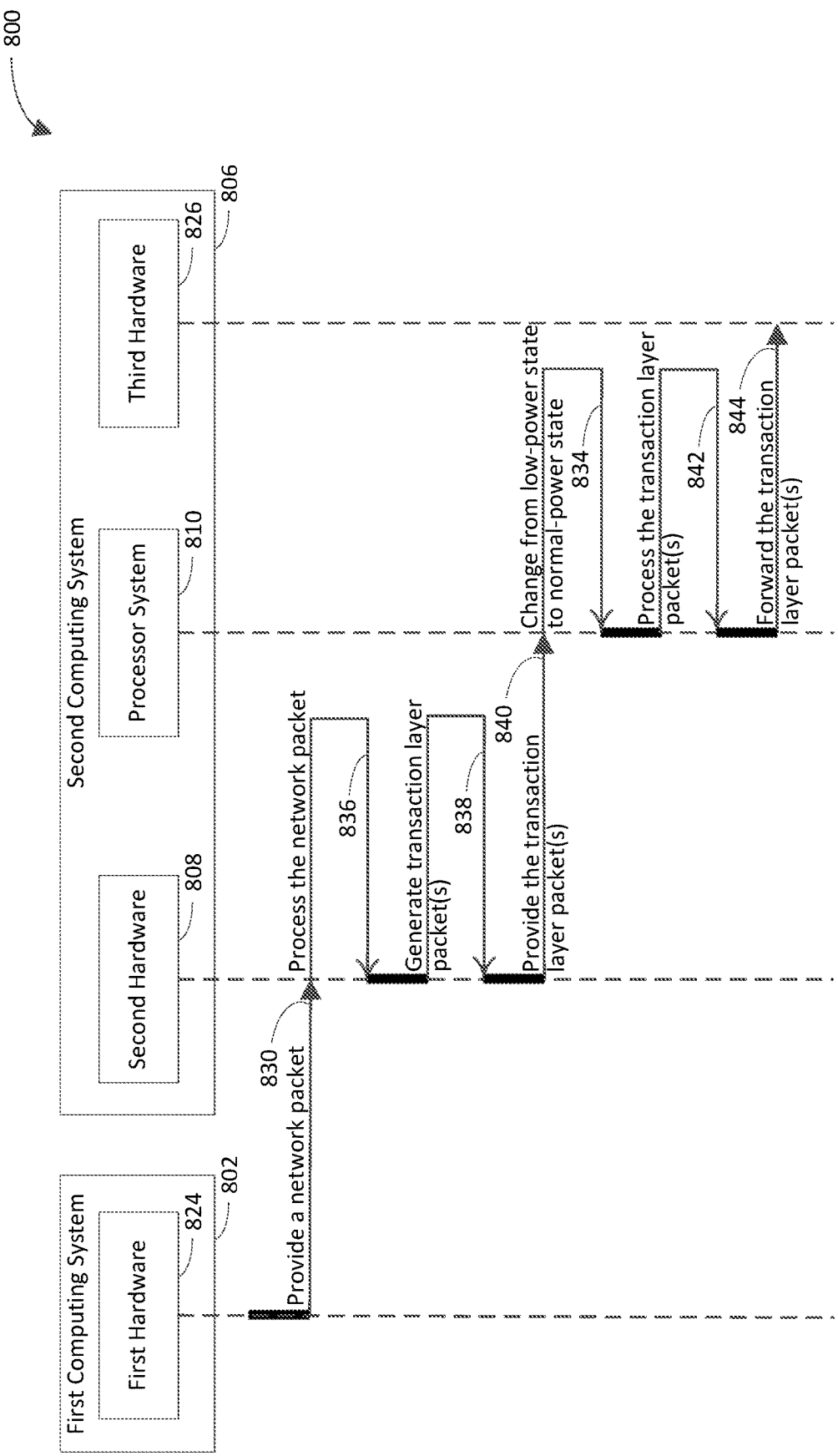
FIG. 8 is another example activity diagram for reducing latency of changing an operating state of a processor from a low-power state to a normal-power state in accordance with an embodiment.

FIG. 8 is another example activity diagram 800 for reducing latency of changing an operating state of a processor system 810 from a low-power state to a normal-power state in accordance with an embodiment. FIG. 8 depicts a first computing system 802 and a second computing system 806. The first computing system 802 includes first hardware 824. The second computing system 806 includes second hardware 808, the processor system 810, and third hardware 826. Activities 830, 834, 836, 838, 840, 842, and 844 will now be described with reference to the first hardware 824, the second hardware 808, the processor system 810, and the third hardware 826.

In activity 830, the first hardware 824 provides a network packet to the second hardware 808.

In activity 836, the second hardware 808 processes the network packet. For instance, the second hardware 808 may decrypt the network packet and/or decompress the network packet.

In activity 838, the second hardware 808 generates transaction layer packet(s) based on the network packet. For instance, the second hardware 808 may divide the network packet into portion(s) and format those portion(s) in accordance with a bus standard, such as the PCIe® bus standard, to generate the respective transaction layer packet(s). The second hardware 808 may perform any of a variety of operations on the transaction layer packet(s) in preparation for the transaction layer packet(s) to be sent to another entity, such as the third hardware 826. For instance, the second hardware 808 may encode the transaction layer packet(s) and/or encrypt the transaction layer packet(s).

In activity 840, the second hardware 808 provides the transaction layer packet(s) to the processor system 810.

In activity 834, the processor system 810 changes its state from the low-power state to the normal-power state based at least in part on receipt of the transaction layer packet(s) from the second hardware 808. The processor system 810 may change its state form the low-power state to the normal-power state without taking into consideration an extent to which the processor system 810 is utilized. For instance, the processor system 810 may change its state independently from whether utilization of the processor system 810 is greater than or equal to a utilization threshold. The utilization of the processor system 810 may indicate a number of processor cycles of the processor system 810 that are consumed within a designated period of time, a number of tasks that are performed by the processor system 810 within a designated period of time, and/or a proportion of the resources of the processor system 810 that are consumed at a time instance or within a designated period of time (e.g., the proportion being greater than a proportion threshold at the time instance or greater than the proportion threshold for a duration of time that is greater than a duration threshold).

In the low-power state, the processor system 810 operates in a manner that consumes a relatively low amount of power. For instance, in the low-power state, selected portions of the functionality of the processor system 810 may be turned off, frequencies of clock signals of the processor system 810 may be reduced (e.g., an operating frequency of the processor system 810 may be reduced), and/or voltages that are used for clock signals of the processor system 810 may be reduced. In the normal-power state, the processor system 810 operates in a manner that consumes a relatively high amount of power. For instance, in the normal-power state, portions of the functionality of the processor system 810 that were turned off in the low-power state may be turned on, frequencies of clock signals of the processor system 810 may be increased (e.g., an operating frequency of the processor system 810 may be increased), and/or voltages that are used for clock signals of the processor system 810 may be increased.

In activity 842, the processor system 810 processes the transaction layer packet(s). For instance, the processor system 810 may decrypt the transaction layer packet(s) and/or decode the transaction layer packet(s).

In activity 844, the processor system 810 forwards the transaction their packet(s) to the third hardware 826. By forwarding the transaction layer packet(s) to the third hardware 826, the processor system 810 may enable the third hardware 826 to process the transaction layer packet(s). It will be recognized that the third hardware 826 and the second hardware 808 may be the same, though the example embodiments are not limited in this respect.

In some example embodiments, one or more of the activities 830, 834, 836, 838, 840, 842, and/or 844 of the activity diagram 800 may not be performed. Moreover, activities in addition to or in lieu of the activities 830, 834, 836, 838, 840, 842, and/or 844 may be performed.

Figure 9:
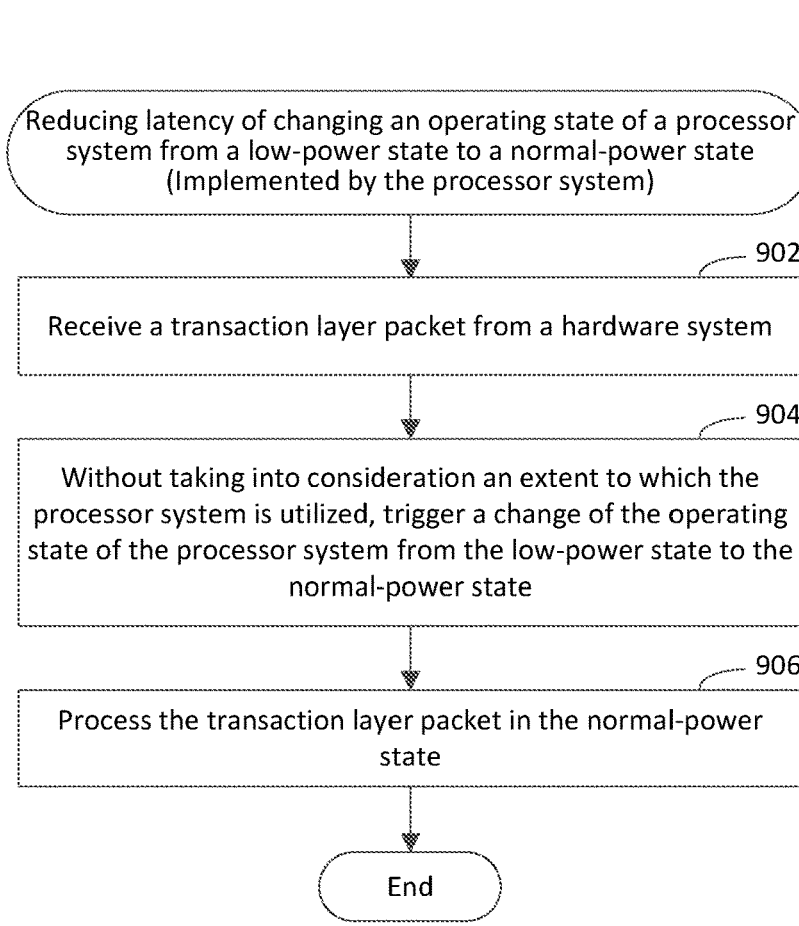
FIG. 9 depicts a flowchart of another example method for reducing latency of changing an operating state of a processor from a low-power state to a normal-power state in accordance with an embodiment.
Figure 10:
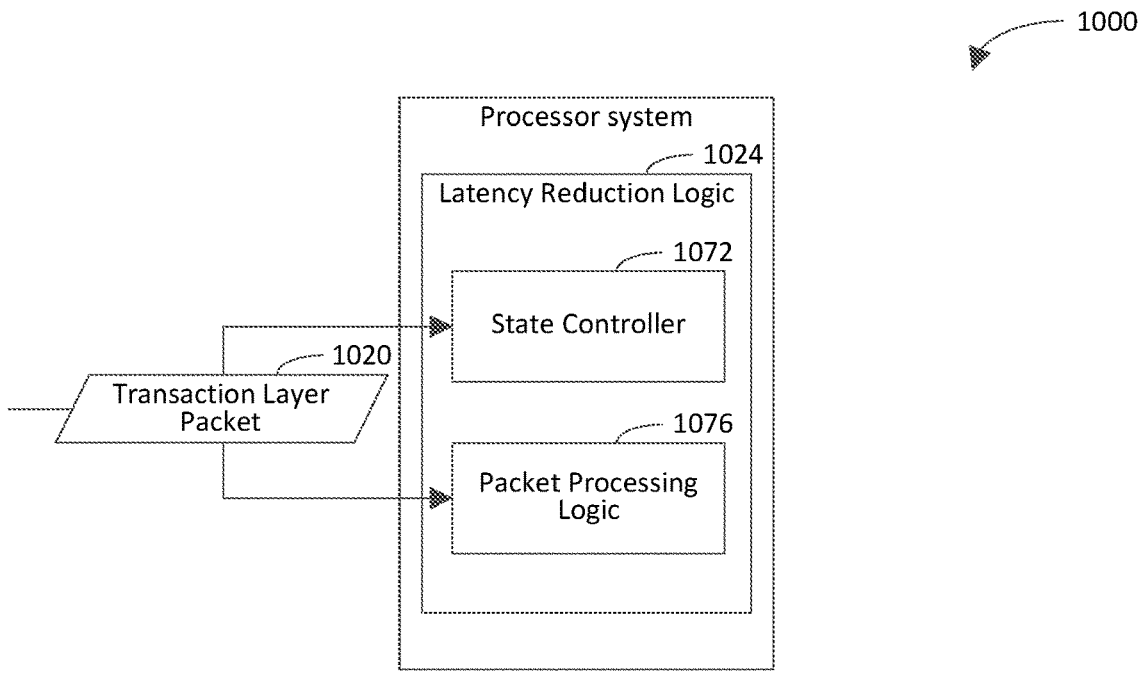
FIG. 10 is a block diagram of another example implementation of a processor system shown in FIG. 1 in accordance with an embodiment.

FIG. 9 depicts a flowchart 900 of another example method for reducing latency of changing an operating state of a processor system from a low-power state to a normal-power state in accordance with an embodiment. Flowchart 900 may be performed by the processor system 110 shown in FIG. 1, for example. For illustrative purposes, flowchart 900 is described with respect to a processor system 1000 shown in FIG. 10, which is another example implementation of the processor system 110. As shown in FIG. 10, the processor system 1000 includes latency reduction logic 1024. The latency reduction logic 1024 includes a state controller 1072 and packet processing logic 1076. Further structural and operational embodiments will be apparent to persons skilled in the relevant art(s) based on the discussion regarding flowchart 900.

As shown in FIG. 9, the method of flowchart 900 begins at step 902. In step 902, a transaction layer packet is received from a hardware system. The transaction layer packet is based at least in part on a network packet. The hardware system may be any suitable type of hardware system, including but not limited to a network interface controller (NIC), an accelerator, storage (e.g., memory, such as a solid-state drive (SSD)), or a graphical processing unit (GPU). In an example implementation, the state controller 1072 receives a transaction layer packet 1020, which is based at least in part on a network packet, from the hardware system.

At step 904, without taking into consideration an extent to which the processor system is utilized, a change of the operating state of the processor system from the low-power state to the normal-power state is triggered. Triggering the change of the operating state may be based at least in part on receipt of the transaction layer packet. The low-power state is configured to cause the processor system to consume a first amount of power. The normal-power state is configured to cause the processor system to consume a second amount of power that is greater than the first amount. In an example implementation, the state controller 1072 triggers a change of the operating state of the processor system 1000 from the low-power state to the normal-power state without taking into consideration an extent to which the processor system 1000 is utilized.

Triggering the change of the operating state of the processor system at step 904 may reduce latency with regard to changing the state of the processor system from the low-power state to the normal-power state. Triggering the change of the operating state of the processor system at step 904 may increase efficiency of the processor system and/or the computing system that includes the processor system. Triggering the change of the operating state of the processor system at step 904 may enable the processor system to reduce power consumption without delaying an exit from the low-power state to the normal-power state.

In an example embodiment, changing the operating state of the processor system includes increasing a frequency at which the processor system operates, increasing a voltage of a clock that is used by the processor system to perform operations, and/or switching a portion of the processor system from an off state to an on state.

In another example embodiment, triggering the change of the operating state of the processor system at step 904 is performed prior to decoding the transaction layer packet by the processor system.

At step 906, the transaction layer packet is processed in the normal-power state. In an example implementation, the packet processing logic 10776 processes the transaction layer packet 1020 in the normal-power state.

In an example embodiment, processing the transaction layer packet at step 906 includes instructing the hardware system to perform a designated task based at least in part on receipt of the transaction layer packet. For example, the designated task may include processing a designated image and displaying the designated image. In another example, the designated task may include processing a designated audio file and playing the designated audio file.

In some example embodiments, one or more steps 902, 904, and/or 906 of flowchart 900 may not be performed. Moreover, steps in addition to or in lieu of steps 902, 904, and/or 906 may be performed.

It will be recognized that the processor system 1000 may not include one or more of the state controller 1072 and/or the packet processing logic 1076. Furthermore, the processor system 1000 may include components in addition to or in lieu of the state controller 1072 and/or the packet processing logic 1076.

Figure 11:
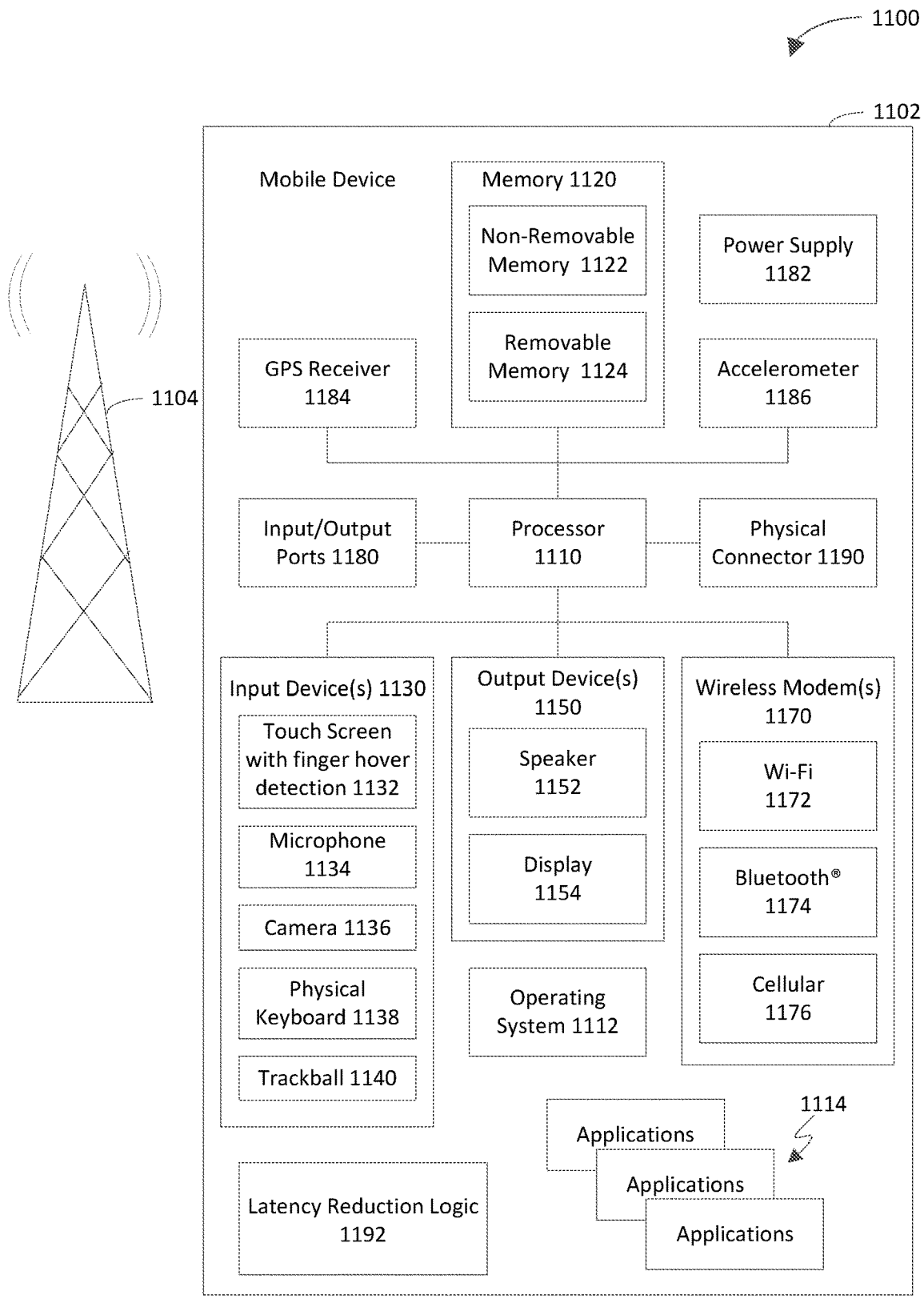
FIG. 11 is a system diagram of an exemplary mobile device in accordance with an embodiment.

FIG. 11 is a system diagram of an exemplary mobile device 1100 including a variety of optional hardware and software components, shown generally as 1102. Any components 1102 in the mobile device may communicate with any other component, though not all connections are shown, for ease of illustration. The mobile device 1100 may be any of a variety of computing devices (e.g., cell phone, smartphone, handheld computer, Personal Digital Assistant (PDA), etc.) and may allow wireless two-way communications with one or more mobile communications networks 1104, such as a cellular or satellite network, or with a local area or wide area network.

The mobile device 1100 may include a processor 1110 (e.g., signal processor, microprocessor, ASIC, or other control and processing logic circuitry) for performing such tasks as signal coding, data processing, input/output processing, power control, and/or other functions. An operating system 1112 may control the allocation and usage of the components 1102 and support for one or more applications 1114 (a.k.a. application programs). The applications 1114 may include common mobile computing applications (e.g., email applications, calendars, contact managers, web browsers, messaging applications) and any other computing applications (e.g., word processing applications, mapping applications, media player applications).

The mobile device 1100 may include memory 1120. The memory 1120 may include non-removable memory 1122 and/or removable memory 1124. The non-removable memory 1122 may include RAM, ROM, flash memory, a hard disk, or other well-known memory storage technologies. The removable memory 1124 may include flash memory or a Subscriber Identity Module (SIM) card, which is well known in GSM communication systems, or other well-known memory storage technologies, such as "smart cards." The memory 1120 may store data and/or code for running the operating system 1112 and the applications 1114. Example data may include web pages, text, images, sound files, video data, or other data sets to be sent to and/or received from one or more network servers or other devices via one or more wired or wireless networks. Memory 1120 may store a subscriber identifier, such as an International Mobile Subscriber Identity (IMSI), and an equipment identifier, such as an International Mobile Equipment Identifier (IMEI). Such identifiers may be transmitted to a network server to identify users and equipment.

The mobile device 1100 may support one or more input devices 1130, such as a touch screen 1132, microphone 1134, camera 1136, physical keyboard 1138 and/or trackball 1140 and one or more output devices 1150, such as a speaker 1152 and a display 1154. Touch screens, such as the touch screen 1132, may detect input in different ways. For example, capacitive touch screens detect touch input when an object (e.g., a fingertip) distorts or interrupts an electrical current running across the surface. As another example, touch screens may use optical sensors to detect touch input when beams from the optical sensors are interrupted. Physical contact with the surface of the screen is not necessary for input to be detected by some touch screens. For example, the touch screen 1132 may support a finger hover detection using capacitive sensing, as is well understood in the art. Other detection techniques may be used, including but not limited to camera-based detection and ultrasonic-based detection. To implement a finger hover, a user's finger is typically within a predetermined spaced distance above the touch screen, such as between 0.1 to 0.25 inches, or between 0.25 inches and 0.5 inches, or between 0.5 inches and 0.75 inches, or between 0.75 inches and 1 inch, or between 1 inch and 1.5 inches, etc.

The mobile device 1100 may include latency reduction logic 1192. The latency reduction logic 1192 is configured to reduce latency of changing an operating state of the processor 1110 from a low-power state to a normal-power state in accordance with any one or more of the techniques described herein. The latency reduction logic 1192 may be incorporated into suitable component(s) 1102. For instance, the latency reduction logic 1192 may be incorporated partially or entirely in the processor 1110, the non-removable memory 1122, the operating system 1112, etc.

Other possible output devices (not shown) may include piezoelectric or other haptic output devices. Some devices may serve more than one input/output function. For example, touch screen 1132 and display 1154 may be combined in a single input/output device. The input devices 1130 may include a Natural User Interface (NUI). An NUI is any interface technology that enables a user to interact with a device in a "natural" manner, free from artificial constraints imposed by input devices such as mice, keyboards, remote controls, and the like. Examples of NUI methods include those relying on speech recognition, touch and stylus recognition, gesture recognition both on screen and adjacent to the screen, air gestures, head and eye tracking, voice and speech, vision, touch, gestures, and machine intelligence. Other examples of a NUI include motion gesture detection using accelerometers/gyroscopes, facial recognition, 3D displays, head, eye, and gaze tracking, immersive augmented reality and virtual reality systems, all of which provide a more natural interface, as well as technologies for sensing brain activity using electric field sensing electrodes (EEG and related methods). Thus, in one specific example, the operating system 1112 or applications 1114 may include speech-recognition software as part of a voice control interface that allows a user to operate the mobile device 1100 via voice commands. Furthermore, the mobile device 1100 may include input devices and software that allows for user interaction via a user's spatial gestures, such as detecting and interpreting gestures to provide input to a gaming application.

Wireless modem(s) 1170 may be coupled to antenna(s) (not shown) and may support two-way communications between the processor 1110 and external devices, as is well understood in the art. The modem(s) 1170 are shown generically and may include a cellular modem 1176 for communicating with the mobile communication network 1104 and/or other radio-based modems (e.g., Bluetooth® 1174 and/or Wi-Fi 1172). At least one of the wireless modem(s) 1170 is typically configured for communication with one or more cellular networks, such as a GSM network for data and voice communications within a single cellular network, between cellular networks, or between the mobile device and a public switched telephone network (PSTN).

The mobile device may further include at least one input/output port 1180, a power supply 1182, a satellite navigation system receiver 1184, such as a Global Positioning System (GPS) receiver, an accelerometer 1186, and/or a physical connector 1190, which may be a USB port, IEEE 1394 (FireWire) port, and/or RS-232 port. The illustrated components 1102 are not required or all-inclusive, as any components may be deleted and other components may be added as would be recognized by one skilled in the art.

Although the operations of some of the disclosed methods are described in a particular, sequential order for convenient presentation, it should be understood that this manner of description encompasses rearrangement, unless a particular ordering is required by specific language set forth herein. For example, operations described sequentially may in some cases be rearranged or performed concurrently. Moreover, for the sake of simplicity, the attached figures may not show the various ways in which the disclosed methods may be used in conjunction with other methods.

Any one or more of the latency reduction logic 122, the latency reduction logic 124, the latency reduction logic 522, the state controller 552, the packet conversion logic 554, the time determination logic 556, the time selection logic 558, the latency reduction logic 724, the state controller 772, the attribute selection logic 774, the packet processing logic 776, the latency reduction logic 1024, the state controller 1072, the packet processing logic 1076, activity diagram 300, flowchart 400, flowchart 600, activity diagram 800, and/or flowchart 900 may be implemented in hardware, software, firmware, or any combination thereof.

For example, any one or more of the latency reduction logic 122, the latency reduction logic 124, the latency reduction logic 522, the state controller 552, the packet conversion logic 554, the time determination logic 556, the time selection logic 558, the latency reduction logic 724, the state controller 772, the attribute selection logic 774, the packet processing logic 776, the latency reduction logic 1024, the state controller 1072, the packet processing logic 1076, activity diagram 300, flowchart 400, flowchart 600, activity diagram 800, and/or flowchart 900 may be implemented, at least in part, as computer program code configured to be executed in one or more processors.

In another example, any one or more of the latency reduction logic 122, the latency reduction logic 124, the latency reduction logic 522, the state controller 552, the packet conversion logic 554, the time determination logic 556, the time selection logic 558, the latency reduction logic 724, the state controller 772, the attribute selection logic 774, the packet processing logic 776, the latency reduction logic 1024, the state controller 1072, the packet processing logic 1076, activity diagram 300, flowchart 400, flowchart 600, activity diagram 800, and/or flowchart 900 may be implemented, at least in part, as hardware logic/electrical circuitry. Such hardware logic/electrical circuitry may include one or more hardware logic components. Examples of a hardware logic component include but are not limited to a field-programmable gate array (FPGA), an application-specific integrated circuit (ASIC), an application-specific standard product (ASSP), a system-on-a-chip system (SoC), a complex programmable logic device (CPLD), etc. For instance, a SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Figure 12:
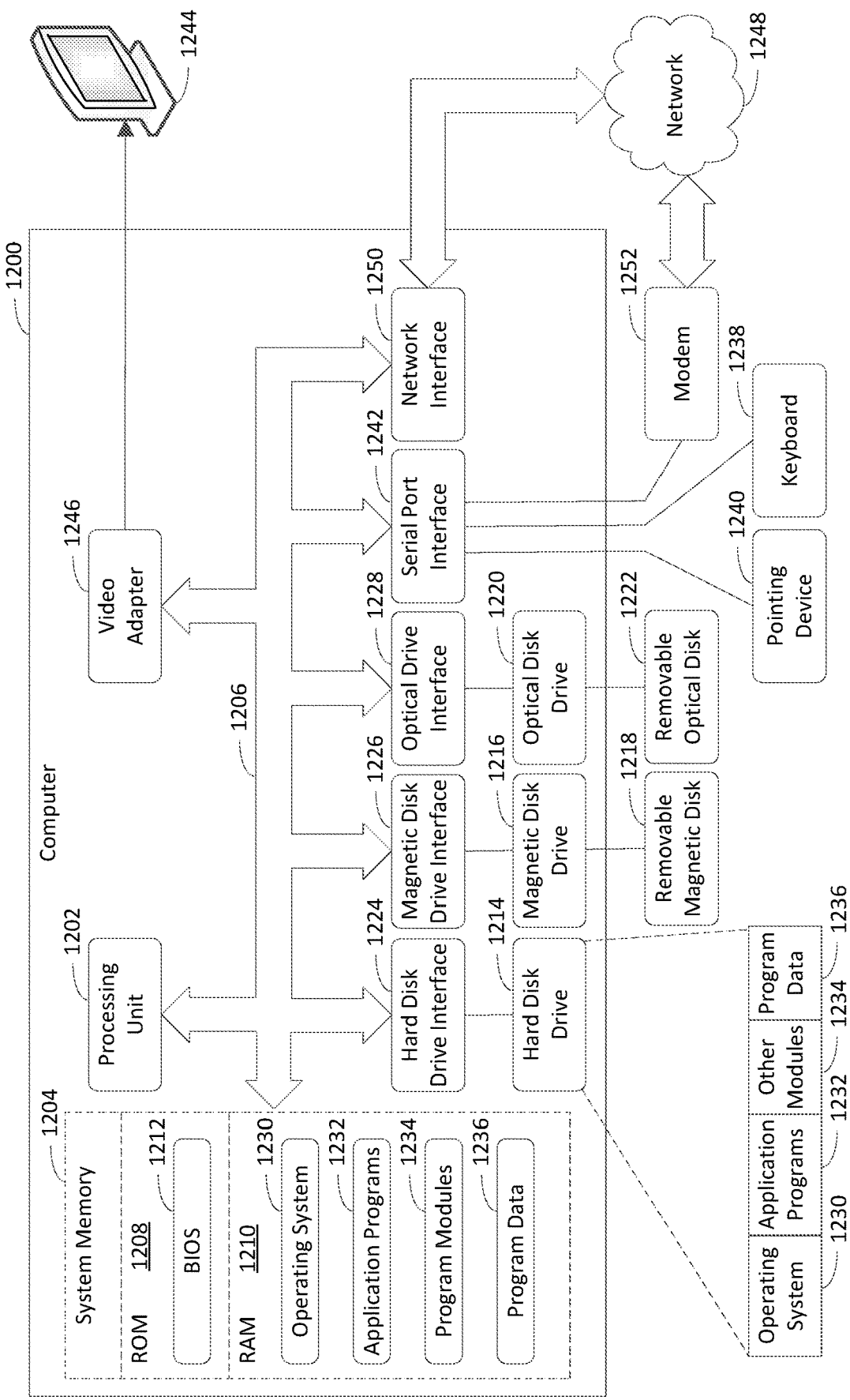
FIG. 12 depicts an example computer in which embodiments may be implemented.

III. Further Discussion of Some Example Embodiments (A1) An example hardware system (FIG. 1, 108; FIG. 2, 208A-208N; FIG. 3, 308; FIG. 5, 500; FIG. 12, 1250) to reduce latency of changing an operating state of a processor (FIG. 1, 110; FIG. 2, 210; FIG. 3, 310; FIG. 7, 700; FIG. 11, 1110; FIG. 12, 1202) from a low-power state to a normal-power state comprises a memory (FIG. 11, 1120; FIG. 12, 1204, 1208, 1210) and a processing system (FIG. 11, 1110; FIG. 12, 1202) coupled to the memory. The processing system is configured to, based at least in part on receipt of a network packet (FIG. 1, 116; FIG. 5, 516) via a network (FIG. 1, 104), prior to a transaction layer packet (FIG. 1, 120; FIG. 5, 520) that is based at least in part on the network packet being provided to the processor by the hardware system, trigger (FIG. 3, 332; FIG. 4, 404) a change of the operating state of the processor from the low-power state to the normal-power state by asynchronously providing a notification (FIG. 1, 118; FIG. 2, 218; FIG. 5, 518) to the processor at a first time instance. The notification indicates that the transaction layer packet is to be provided to the processor at a second time instance that temporally follows the first time instance. The low-power state is configured to cause the processor to consume a first amount of power. The normal-power state is configured to cause the processor to consume a second amount of power that is greater than the first amount. The processing system is further configured to cause (FIG. 3, 340; FIG. 4, 406) the transaction layer packet to be processed in the normal-power state by providing the transaction layer packet to the processor at the second time instance.

(A2) In the example hardware system of A1, wherein the notification indicates an amount of time between the first time instance at which the notification is asynchronously provided to the processor and the second time instance at which the transaction layer packet is to be provided to the processor.

(A3) In the example hardware system of any of A1-A2, wherein the processor system is configured to: asynchronously provide the notification to the processor prior to completion of processing of the network packet by the hardware system.

(A4) In the example hardware system of any of A1-A3, wherein the processor system is further configured to: determine an amount of time that is to be consumed to complete the processing of the network packet by the hardware system; and select the first time instance at which the notification is provided to the processor based at least in part on the amount of time.

(A5) In the example hardware system of any of A1-A4, wherein the processor system is configured to: complete the processing of the network packet to generate the transaction layer packet; and based at least in part on the processing of the network packet being completed, provide the transaction layer packet to the processor at the second time instance.

(A6) In the example hardware system of any of A1-A5, wherein the processor system is configured to: trigger the processor to increase a frequency at which the processor operates by asynchronously providing the notification to the processor at the first time instance.

(A7) In the example hardware system of any of A1-A6, wherein the processor system is configured to: trigger the processor to increase a voltage of a clock that is used to perform operations by the processor by asynchronously providing the notification to the processor at the first time instance.

(A8) In the example hardware system of any of A1-A7, wherein the processor system is configured to: trigger the processor to switch a portion of the processor from an off state to an on state by asynchronously providing the notification to the processor at the first time instance.

(A9) In the example hardware system of any of A1-A8, further comprising: a Peripheral Component Internet Express (PCIe) WAKE #pin; wherein the processor system is configured to: asynchronously provide the notification to the processor via the PCIe WAKE #pin at the first time instance.

(A10) In the example hardware system of any of A1-A9, wherein the processor system is configured to: at the first time instance, asynchronously provide the notification to the processor via a first connection that is included in a plurality of connections that connect a plurality of respective hardware systems to the processor via a Boolean OR gate.

(B1) A first example computing system (FIG. 1, 106; FIG. 2, 200; FIG. 3, 300; FIG. 11, 1102; FIG. 12, 1200) to reduce latency of changing an operating state of a processor system (FIG. 1, 110; FIG. 2, 210; FIG. 3, 310; FIG. 7, 700; FIG. 11, 1110; FIG. 12, 1202) from a low-power state to a normal-power state comprises a memory (FIG. 11, 1120; FIG. 12, 1204, 1208, 1210) and the processor system coupled to the memory. The processor system is configured to receive (FIG. 3, 332; FIG. 6, 602) a notification (FIG. 1, 118; FIG. 2, 218; FIG. 5, 518) from a hardware system (FIG. 1, 108; FIG. 2, 208A-208N; FIG. 3, 308; FIG. 5, 500; FIG. 12, 1250) at a first time instance. The notification indicates that a transaction layer packet (FIG. 1, 120; FIG. 5, 520), which is based at least in part on a network packet (FIG. 1, 116; FIG. 5, 516), is to be received by the processor system from the hardware system at a second time instance that temporally follows the first time instance. The processor system is further configured to, based at least in part on receipt of the notification, change (FIG. 3, 334; FIG. 6, 604) the operating state of the processor system from the low-power state to the normal-power state. The low-power state is configured to cause the processor system to consume a first amount of power. The normal-power state is configured to cause the processor system to consume a second amount of power that is greater than the first amount. The processor system is further configured to receive (FIG. 3, 340; FIG. 6, 606) the transaction layer packet from the hardware system at the second time instance. The processor system is further configured to process (FIG. 3, 342; FIG. 6, 608) the transaction layer packet in the normal-power state based at least in part on receipt of the transaction layer packet at the second time instance.

(B2) In the example computing system of B1, wherein the processor system is configured to: change the operating state of the processor system from the low-power state to the normal-power state before the transaction layer packet is received from the hardware system at the second time instance.

(B3) In the example computing system of any of B1-B2, wherein the notification indicates an amount of time between the first time instance at which the notification is received by the processor system from the hardware system and the second time instance at which the transaction layer packet is to be received by the processor system from the hardware system; and wherein the processor system is configured to: select an attribute of the processor system from a plurality of attributes of the processor system to be changed based at least in part on the processor system being capable of changing the attribute from a first value to a second value within the amount of time between the first time instance and the second time instance; and change the operating state of the processor system from the low-power state to the normal-power state by changing the selected attribute of the processor system from the first value to the second value.

(B4) In the example computing system of any of B1-B3, wherein the processor system is configured to: based at least in part on receipt of the notification, change the operating state of the processor system by increasing a frequency at which the processor system operates.

(B5) In the example computing system of any of B1-B4, wherein the processor system is configured to: based at least in part on receipt of the notification, change the operating state of the processor system by increasing a voltage of a clock that is used by the processor system to perform operations.

(B6) In the example computing system of any of B1-B5, wherein the processor system is configured to: based at least in part on receipt of the notification, change the operating state of the processor system by switching a portion of the processor system from an off state to an on state.

(B7) In the example computing system of any of B1-B6, wherein the processor system comprises: a Peripheral Component Internet Express (PCIe) WAKE #pin; and wherein the processor system is configured to: receive the notification from the hardware system via the PCIe WAKE #pin at the first time instance.

(B8) In the example computing system of any of B1-B7, wherein the processor system is configured to: at the first time instance, receive the notification from the hardware system via a first connection that is included in a plurality of connections that connect a plurality of respective hardware systems to the processor system via a Boolean OR gate.

(B9) In the example computing system of any of B1-B8, wherein the processor system is configured to: instruct the hardware system to perform a designated task based at least in part on receipt of the transaction layer packet.

(C1) A second example computing system (FIG. 1, 106; FIG. 2, 200; FIG. 8, 806; FIG. 11, 1102; FIG. 12, 1200) to reduce latency of changing an operating state of a processor system (FIG. 1, 110; FIG. 2, 210; FIG. 8, 810; FIG. 10, 1000; FIG. 11, 1110; FIG. 12, 1202) from a low-power state to a normal-power state comprises a memory (FIG. 11, 1120; FIG. 12, 1204, 1208, 1210) and the processor system coupled to the memory. The processor system is configured to receive (FIG. 8, 840; FIG. 9, 902) a transaction layer packet (FIG. 1, 120; FIG. 10, 1020), which is based at least in part on a network packet (FIG. 1, 116), from a hardware system (FIG. 1, 108; FIG. 2, 208A-208N; FIG. 8, 808; FIG. 12, 1250). The processor system is further configured to, based at least in part on receipt of the transaction layer packet and without taking into consideration an extent to which the processor system is utilized, trigger (FIG. 8, 834; FIG. 9, 904) a change of the operating state of the processor system from the low-power state to the normal-power state. The low-power state is configured to cause the processor system to consume a first amount of power. The normal-power state is configured to cause the processor system to consume a second amount of power that is greater than the first amount. The processor system is further configured to process (FIG. 8, 842; FIG. 9, 906) the transaction layer packet in the normal-power state.

(C2) In the example computing system of C1, wherein the processor system is configured to: trigger the change of the operating state of the processor system by increasing a frequency at which the processor system operates.

(C3) In the example computing system of any of C1-C2, wherein the processor system is configured to: trigger the change of the operating state of the processor system by increasing a voltage of a clock that is used by the processor system to perform operations.

(C4) In the example computing system of any of C1-C3, wherein the processor system is configured to: trigger the change of the operating state of the processor system by switching a portion of the processor system from an off state to an on state.

(C5) In the example computing system of any of C1-C4, wherein the processor system is configured to: trigger the change of the operating state of the processor system from the low-power state to the normal-power state prior to decoding the transaction layer packet by the processor system.

(C6) In the example computing system of any of C1-05, wherein the processor system is configured to: instruct the hardware system to perform a designated task based at least in part on receipt of the transaction layer packet.

(D1) A first example method of reducing latency of changing an operating state of a processor (FIG. 1, 110; FIG. 2, 210; FIG. 3, 310; FIG. 7, 700; FIG. 11, 1110; FIG. 12, 1202) from a low-power state to a normal-power state. The method is implemented by a hardware system (FIG. 1, 108; FIG. 2, 208A-208N; FIG. 3, 308; FIG. 5, 500; FIG. 12, 1250). The method comprises receiving (FIG. 3, 330; FIG. 4, 402) a network packet (FIG. 1, 116; FIG. 5, 516) via a network (FIG. 1, 104). The method further comprises, based at least in part on receipt of the network packet, prior to a transaction layer packet (FIG. 1, 120; FIG. 5, 520) that is based at least in part on the network packet being provided to the processor by the hardware system, triggering (FIG. 3, 332; FIG. 4, 404) a change of the operating state of the processor from the low-power state to the normal-power state by asynchronously providing a notification (FIG. 1, 118; FIG. 2, 218; FIG. 5, 518) to the processor at a first time instance. The notification indicates that the transaction layer packet is to be provided to the processor at a second time instance that temporally follows the first time instance. The low-power state is configured to cause the processor to consume a first amount of power. The normal-power state is configured to cause the processor to consume a second amount of power that is greater than the first amount. The method further comprises causing (FIG. 3, 340; FIG. 4, 406) the transaction layer packet to be processed in the normal-power state by providing the transaction layer packet to the processor at the second time instance.

(D2) In the method of D1, wherein the notification indicates an amount of time between the first time instance at which the notification is asynchronously provided to the processor and the second time instance at which the transaction layer packet is to be provided to the processor.

(D3) In the method of any of D1-D2, wherein asynchronously providing the notification to the processor comprises: asynchronously providing the notification to the processor prior to completion of processing of the network packet by the hardware system.

(D4) In the method of any of D1-D3, further comprising: determining an amount of time that is to be consumed to complete the processing of the network packet by the hardware system; and selecting the first time instance at which the notification is provided to the processor based at least in part on the amount of time.

(D5) In the method of any of D1-D4, further comprising: completing the processing of the network packet to generate the transaction layer packet; wherein the transaction layer packet is provided to the processor at the second time instance based at least in part on the processing of the network packet being completed.

(D6) In the method of any of D1-D5, wherein triggering the change of the operating state of the processor comprises: triggering the processor to increase a frequency at which the processor operates by asynchronously providing the notification to the processor at the first time instance.

(D7) In the method of any of D1-D6, wherein triggering the change of the operating state of the processor comprises: triggering the processor to increase a voltage of a clock that is used to perform operations by the processor by asynchronously providing the notification to the processor at the first time instance.

(D8) In the method of any of D1-D7, wherein triggering the change of the operating state of the processor comprises: triggering the processor to switch a portion of the processor from an off state to an on state by asynchronously providing the notification to the processor at the first time instance.

(D9) In the method of any of D1-D8, wherein triggering the change of the operating state of the processor from the low-power state to the normal-power state comprises: asynchronously providing the notification to the processor via a Peripheral Component Internet Express (PCIe) WAKE #pin of the hardware system at the first time instance.

(D10) In the method of any of D1-D9, wherein triggering the change of the operating state of the processor from the low-power state to the normal-power state comprises: at the first time instance, asynchronously providing the notification to the processor via a first connection that is included in a plurality of connections that connect a plurality of respective hardware systems to the processor via a Boolean OR gate.

(E1) A second example method of reducing latency of changing an operating state of a processor system (FIG. 1, 110; FIG. 2, 210; FIG. 3, 310; FIG. 7, 700; FIG. 11, 1110; FIG. 12, 1202) from a low-power state to a normal-power state. The method is implemented by the processor system. The method comprises receiving (FIG. 3, 332; FIG. 6, 602) a notification (FIG. 1, 118; FIG. 2, 218; FIG. 5, 518) from a hardware system (FIG. 1, 108; FIG. 2, 208A-208N; FIG. 3, 308; FIG. 5, 500; FIG. 12, 1250) at a first time instance. The notification indicates that a transaction layer packet (FIG. 1, 120; FIG. 5, 520), which is based at least in part on a network packet (FIG. 1, 116; FIG. 5, 516), is to be received by the processor system from the hardware system at a second time instance that temporally follows the first time instance. The method further comprises, based at least in part on receipt of the notification, changing (FIG. 3, 334; FIG. 6, 604) the operating state of the processor system from the low-power state to the normal-power state, wherein the low-power state is configured to cause the processor system to consume a first amount of power, wherein the normal-power state is configured to cause the processor system to consume a second amount of power that is greater than the first amount. The method further comprises receiving (FIG. 3, 340; FIG. 6, 606) the transaction layer packet from the hardware system at the second time instance. The method further comprises processing (FIG. 3, 342; FIG. 6, 608) the transaction layer packet in the normal-power state based at least in part on receipt of the transaction layer packet at the second time instance.

(E2) In the method of E1, wherein changing the operating state of the processor system comprises: changing the operating state of the processor system from the low-power state to the normal-power state before the transaction layer packet is received from the hardware system at the second time instance.

(E3) In the method of any of E1-E2, wherein the notification indicates an amount of time between the first time instance at which the notification is received by the processor system from the hardware system and the second time instance at which the transaction layer packet is to be received by the processor system from the hardware system; wherein the method further comprises: selecting an attribute of the processor system from a plurality of attributes of the processor system to be changed based at least in part on the processor system being capable of changing the attribute from a first value to a second value within the amount of time between the first time instance and the second time instance; and wherein changing the operating state of the processor system comprises: changing the operating state of the processor system from the low-power state to the normal-power state by changing the selected attribute of the processor system from the first value to the second value.

(E4) In the method of any of E1-E3, wherein changing the operating state of the processor system comprises: increasing a frequency at which the processor system operates.

(E5) In the method of any of E1-E4, wherein changing the operating state of the processor system comprises: increasing a voltage of a clock that is used by the processor system to perform operations.

(E6) In the method of any of E1-E5, wherein changing the operating state of the processor system comprises: switching a portion of the processor system from an off state to an on state.

(E7) In the method of any of E1-E6, wherein receiving the notification from the hardware system comprises: receiving the notification from the hardware system via a Peripheral Component Internet Express (PCIe) WAKE #pin of the processor system at the first time instance.

(E8) In the method of any of E1-E7, wherein receiving the notification from the hardware system comprises: at the first time instance, receiving the notification from the hardware system via a first connection that is included in a plurality of connections that connect a plurality of respective hardware systems to the processor system via a Boolean OR gate.

(E9) In the method of any of E1-E8, wherein processing the transaction layer packet comprises: instructing the hardware system to perform a designated task based at least in part on receipt of the transaction layer packet.

(F1) A third example method of reducing latency of changing an operating state of a processor system (FIG. 1, 110; FIG. 2, 210; FIG. 8, 810; FIG. 10, 1000; FIG. 11, 1110; FIG. 12, 1202) from a low-power state to a normal-power state. The method is implemented by the processor system. The method comprises receiving (FIG. 8, 840; FIG. 9, 902) a transaction layer packet (FIG. 1, 120; FIG. 10, 1020), which is based at least in part on a network packet (FIG. 1, 116), from a hardware system (FIG. 1, 108; FIG. 2, 208A-208N; FIG. 8, 808; FIG. 12, 1250). The method further comprises, based at least in part on receipt of the transaction layer packet and without taking into consideration an extent to which the processor system is utilized, triggering (FIG. 8, 834; FIG. 9, 904) a change of the operating state of the processor system from the low-power state to the normal-power state. The low-power state is configured to cause the processor system to consume a first amount of power. The normal-power state is configured to cause the processor system to consume a second amount of power that is greater than the first amount. The method further comprises processing (FIG. 8, 842; FIG. 9, 906) the transaction layer packet in the normal-power state.

(F2) In the method of F1, wherein triggering the change of the operating state of the processor system comprises: increasing a frequency at which the processor system operates.

(F3) In the method of any of F1-F2, wherein triggering the change of the operating state of the processor system comprises: increasing a voltage of a clock that is used by the processor system to perform operations.

(F4) In the method of any of F1-F3, wherein triggering the change of the operating state of the processor system comprises: switching a portion of the processor system from an off state to an on state.

(F5) In the method of any of F1-F4, wherein triggering the change of the operating state of the processor system comprises: triggering the change of the operating state of the processor system from the low-power state to the normal-power state prior to decoding the transaction layer packet by the processor system.

(F6) In the method of any of F1-F5, wherein processing the transaction layer packet comprises: instructing the hardware system to perform a designated task based at least in part on receipt of the transaction layer packet.

(G1) A first example computer program product (FIG. 11, 1124; FIG. 12, 1218, 1222) comprising a computer-readable storage medium having instructions recorded thereon for enabling a processor-based system (FIG. 1, 106; FIG. 2, 200; FIG. 8, 806; FIG. 11, 1102; FIG. 12, 1200) to reduce latency of changing an operating state of a processor (FIG. 1, 110; FIG. 2, 210; FIG. 3, 310; FIG. 7, 700; FIG. 11, 1110; FIG. 12, 1202), which is included in the processor-based system, from a low-power state to a normal-power state by performing operations. The operations comprise receiving a network packet (FIG. 1, 116; FIG. 5, 516) at a hardware system (FIG. 1, 108; FIG. 2, 208A-208N; FIG. 3, 308; FIG. 5, 500; FIG. 12, 1250), which is included in the processor-based system, via a network (FIG. 1, 104). The operations further comprise, based at least in part on receipt of the network packet at the hardware system, prior to a transaction layer packet (FIG. 1, 120; FIG. 5, 520) that is based at least in part on the network packet being provided to the processor by the hardware system, triggering (FIG. 3, 332; FIG. 4, 404) a change of the operating state of the processor from the low-power state to the normal-power state by asynchronously providing a notification (FIG. 1, 118; FIG. 2, 218; FIG. 5, 518) to the processor at a first time instance. The notification indicates that the transaction layer packet is to be provided to the processor at a second time instance that temporally follows the first time instance. The low-power state is configured to cause the processor to consume a first amount of power. The normal-power state is configured to cause the processor to consume a second amount of power that is greater than the first amount. The operations further comprise causing (FIG. 3, 340; FIG. 4, 406) the transaction layer packet to be processed in the normal-power state by the processor by providing the transaction layer packet from the hardware system to the processor at the second time instance.

(H1) A second example computer program product (FIG. 16, 1618, 1622) comprising a computer-readable storage medium having instructions recorded thereon for enabling a processor-based system (FIG. 1, 106; FIG. 2, 200; FIG. 3, 300; FIG. 11, 1102; FIG. 12, 1200) to reduce latency of changing an operating state of a processor (FIG. 1, 110; FIG. 2, 210; FIG. 3, 310; FIG. 7, 700; FIG. 11, 1110; FIG. 12, 1202), which is included in the processor-based system, from a low-power state to a normal-power state by performing operations. The operations comprise receiving (FIG. 3, 332; FIG. 6, 602) a notification (FIG. 1, 118; FIG. 2, 218; FIG. 5, 518) at the processor from a hardware system (FIG. 1, 108; FIG. 2, 208A-208N; FIG. 3, 308; FIG. 5, 500; FIG. 12, 1250) at a first time instance. The notification indicates that a transaction layer packet (FIG. 1, 120; FIG. 5, 520), which is based at least in part on a network packet (FIG. 1, 116; FIG. 5, 516), is to be received by the processor from the hardware system at a second time instance that temporally follows the first time instance. The operations further comprise, based at least in part on receipt of the notification at the processor, changing (FIG. 3, 334; FIG. 6, 604) the operating state of the processor from the low-power state to the normal-power state. The low-power state is configured to cause the processor to consume a first amount of power. The normal-power state is configured to cause the processor to consume a second amount of power that is greater than the first amount. The operations further comprise receiving (FIG. 3, 340; FIG. 6, 606) the transaction layer packet at the processor from the hardware system at the second time instance. The operations further comprise processing (FIG. 3, 342; FIG. 6, 608) the transaction layer packet in the normal-power state by the processor based at least in part on receipt of the transaction layer packet by the processor at the second time instance.

(I1) A third example computer program product (FIG. 16, 1618, 1622) comprising a computer-readable storage medium having instructions recorded thereon for enabling a processor-based system (FIG. 1, 106; FIG. 2, 200; FIG. 8, 806; FIG. 11, 1102; FIG. 12, 1200) to reduce latency of changing an operating state of a processor (FIG. 1, 110; FIG. 2, 210; FIG. 8, 810; FIG. 10, 1000; FIG. 11, 1110; FIG. 12, 1202), which is included in the processor-based system, from a low-power state to a normal-power state by performing operations. The operations comprise receiving (FIG. 8, 840; FIG. 9, 902) a transaction layer packet (FIG. 1, 120; FIG. 10, 1020), which is based at least in part on a network packet (FIG. 1, 116), by the processor from a hardware system (FIG. 1, 108; FIG. 2, 208A-208N; FIG. 8, 808; FIG. 12, 1250). The operations further comprise, based at least in part on receipt of the transaction layer packet by the processor and without taking into consideration an extent to which the processor is utilized, triggering (FIG. 8, 834; FIG. 9, 904) a change of the operating state of the processor from the low-power state to the normal-power state. The low-power state is configured to cause the processor to consume a first amount of power. The normal-power state is configured to cause the processor to consume a second amount of power that is greater than the first amount. The operations further comprise processing (FIG. 8, 842; FIG. 9, 906) the transaction layer packet in the normal-power state by the processor.

IV. Example Computer System

FIG. 12 depicts an example computer 1200 in which embodiments may be implemented. Any one or more of the first computing device 102 and/or the second computing device 106 shown in FIG. 1; the computing device 200 shown in FIG. 2; the first computing device 302 and/or the second computing device 306 shown in FIG. 3; and/or the first computing device 802 and/or the second computing device 806 shown in FIG. 8 may be implemented using computer 1200, including one or more features of computer 1200 and/or alternative features. Computer 1200 may be a general-purpose computing device in the form of a conventional personal computer, a mobile computer, or a workstation, for example, or computer 1200 may be a special purpose computing device. The description of computer 1200 provided herein is provided for purposes of illustration, and is not intended to be limiting. Embodiments may be implemented in further types of computer systems, as would be known to persons skilled in the relevant art(s).

As shown in FIG. 12, computer 1200 includes a processing unit 1202, a system memory 1204, and a bus 1206 that couples various system components including system memory 1204 to processing unit 1202. Bus 1206 represents one or more of any of several types of bus structures, including a memory bus or memory controller, a peripheral bus, an accelerated graphics port, and a processor or local bus using any of a variety of bus architectures. System memory 1204 includes read only memory (ROM) 1208 and random access memory (RAM) 1210. A basic input/output system 1212 (BIOS) is stored in ROM 1208.

Computer 1200 also has one or more of the following drives: a hard disk drive 1214 for reading from and writing to a hard disk, a magnetic disk drive 1216 for reading from or writing to a removable magnetic disk 1218, and an optical disk drive 1220 for reading from or writing to a removable optical disk 1222 such as a CD ROM, DVD ROM, or other optical media. Hard disk drive 1214, magnetic disk drive 1216, and optical disk drive 1220 are connected to bus 1206 by a hard disk drive interface 1224, a magnetic disk drive interface 1226, and an optical drive interface 1228, respectively. The drives and their associated computer-readable storage media provide nonvolatile storage of computer-readable instructions, data structures, program modules and other data for the computer. Although a hard disk, a removable magnetic disk and a removable optical disk are described, other types of computer-readable storage media can be used to store data, such as flash memory cards, digital video disks, random access memories (RAMs), read only memories (ROM), and the like.

A number of program modules may be stored on the hard disk, magnetic disk, optical disk, ROM, or RAM. These programs include an operating system 1230, one or more application programs 1232, other program modules 1234, and program data 1236. Application programs 1232 or program modules 1234 may include, for example, computer program logic for implementing any one or more of (e.g., at least a portion of) the latency reduction logic 122, the latency reduction logic 124, the latency reduction logic 522, the state controller 552, the packet conversion logic 554, the time determination logic 556, the time selection logic 558, the latency reduction logic 724, the state controller 772, the attribute selection logic 774, the packet processing logic 776, the latency reduction logic 1024, the state controller 1072, the packet processing logic 1076, activity diagram 300 (including any activity of activity diagram 300), flowchart 400 (including any step of flowchart 400), flowchart 600 (including any step of flowchart 600), activity diagram 800 (including any activity of activity diagram 800), and/or flowchart 900 (including any step of flowchart 900), as described herein.

A user may enter commands and information into the computer 1200 through input devices such as keyboard 1238 and pointing device 1240. Other input devices (not shown) may include a microphone, joystick, game pad, satellite dish, scanner, touch screen, camera, accelerometer, gyroscope, or the like. These and other input devices are often connected to the processing unit 1202 through a serial port interface 1242 that is coupled to bus 1206, but may be connected by other interfaces, such as a parallel port, game port, or a universal serial bus (USB).

A display device 1244 (e.g., a monitor) is also connected to bus 1206 via an interface, such as a video adapter 1246. In addition to display device 1244, computer 1200 may include other peripheral output devices (not shown) such as speakers and printers.

Computer 1200 is connected to a network 1248 (e.g., the Internet) through a network interface or adapter 1250, a modem 1252, or other means for establishing communications over the network. Modem 1252, which may be internal or external, is connected to bus 1206 via serial port interface 1242.

As used herein, the terms "computer program medium" and "computer-readable storage medium" are used to generally refer to media (e.g., non-transitory media) such as the hard disk associated with hard disk drive 1214, removable magnetic disk 1218, removable optical disk 1222, as well as other media such as flash memory cards, digital video disks, random access memories (RAMs), read only memories (ROM), and the like. A computer-readable storage medium is not a signal, such as a carrier signal or a propagating signal. For instance, a computer-readable storage medium may not include a signal. Accordingly, a computer-readable storage medium does not constitute a signal per se. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Example embodiments are also directed to such communication media.

As noted above, computer programs and modules (including application programs 1232 and other program modules 1234) may be stored on the hard disk, magnetic disk, optical disk, ROM, or RAM. Such computer programs may also be received via network interface 1250 or serial port interface 1242. Such computer programs, when executed or loaded by an application, enable computer 1200 to implement features of embodiments discussed herein. Accordingly, such computer programs represent controllers of the computer 1200.

Example embodiments are also directed to computer program products comprising software (e.g., computer-readable instructions) stored on any computer-useable medium. Such software, when executed in one or more data processing devices, causes data processing device(s) to operate as described herein. Embodiments may employ any computer-useable or computer-readable medium, known now or in the future. Examples of computer-readable mediums include, but are not limited to storage devices such as RAM, hard drives, floppy disks, CD ROMs, DVD ROMs, zip disks, tapes, magnetic storage devices, optical storage devices, MEMS-based storage devices, nanotechnology-based storage devices, and the like.

It will be recognized that the disclosed technologies are not limited to any particular computer or type of hardware. Certain details of suitable computers and hardware are well known and need not be set forth in detail in this disclosure.

V CONCLUSION

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims, and other equivalent features and acts are intended to be within the scope of the claims.

What is claimed is:

1. A hardware system to reduce latency of changing an operating state of a processor from a low-power state to a normal-power state, the hardware system comprising:
   memory; and
   a processor system coupled to the memory, the processor system configured to:
      determine an amount of time that is to be consumed to complete processing of a network packet, which is received via a network, by the hardware system;
      select a first time instance at which a notification is to be provided to the processor based at least in part on the amount of time;
      prior to a transaction layer packet that is based at least in part on the network packet being provided to the processor by the hardware system, trigger a change of the operating state of the processor from the low-power state to the normal-power state by asynchronously providing the notification to the processor at the first time instance prior to completion of the processing of the network packet by the hardware system, the notification indicating that the transaction layer packet is to be provided to the processor at a second time instance that temporally follows the first time instance, wherein the low-power state is configured to cause the processor to consume a first amount of power, and wherein the normal-power state is configured to cause the processor to consume a second amount of power that is greater than the first amount; and
      cause the transaction layer packet to be processed in the normal-power state by providing the transaction layer packet to the processor at the second time instance.

2. The hardware system of claim 1, wherein the notification indicates an amount of time between the first time instance at which the notification is asynchronously provided to the processor and the second time instance at which the transaction layer packet is to be provided to the processor.

3. The hardware system of claim 1, wherein the processor system is configured to:
   complete the processing of the network packet to generate the transaction layer packet; and
   based at least in part on the processing of the network packet being completed, provide the transaction layer packet to the processor at the second time instance.

4. The hardware system of claim 1, wherein the processor system is configured to:
   trigger the processor to increase a frequency at which the processor operates by asynchronously providing the notification to the processor at the first time instance.

5. The hardware system of claim 1, wherein the processor system is configured to:
   trigger the processor to increase a voltage of a clock that is used to perform operations by the processor by asynchronously providing the notification to the processor at the first time instance.

6. The hardware system of claim 1, wherein the processor system is configured to:
   trigger the processor to switch a portion of the processor from an off state to an on state by asynchronously providing the notification to the processor at the first time instance.

7. The hardware system of claim 1, further comprising:
a Peripheral Component Internet Express (PCIe) WAKE #pin;
wherein the processor system is configured to:
asynchronously provide the notification to the processor via the PCIe WAKE #pin at the first time instance.

8. The hardware system of claim 1, wherein the processor system is configured to:
at the first time instance, asynchronously provide the notification to the processor via a first connection that is included in a plurality of connections that connect a plurality of respective hardware systems to the processor via a Boolean OR gate.

9. The hardware system of claim 1, wherein the notification specifies a difference between the first time instance and the second time instance without specifying the second time instance.

10. The hardware system of claim 1, wherein the notification specifies the difference between the first time instance and the second time instance without specifying the first time instance and without specifying the second time instance.

11. A method of reducing latency of changing an operating state of a processor system from a low-power state to a normal-power state, the method implemented by the processor system, the method comprising:
receiving a notification from a hardware system at a first time instance, the notification indicating that a transaction layer packet, which is based at least in part on a network packet, is to be received by the processor system from the hardware system at a second time instance that temporally follows the first time instance, wherein the notification indicates an amount of time between the first time instance and the second time instance;
selecting an attribute of the processor system from a plurality of attributes of the processor system to be changed based at least in part on the processor system being capable of changing the attribute from a first value to a second value within the amount of time between the first time instance and the second time instance;
based at least in part on receipt of the notification, changing the operating state of the processor system from the low-power state to the normal-power state by changing the attribute of the processor system, which is selected from the plurality of attributes, from the first value to the second value, wherein the low-power state is configured to cause the processor system to consume a first amount of power, wherein the normal-power state is configured to cause the processor system to consume a second amount of power that is greater than the first amount;
receiving the transaction layer packet from the hardware system at the second time instance; and
processing the transaction layer packet in the normal-power state based at least in part on receipt of the transaction layer packet at the second time instance.

12. The method of claim 11, wherein changing the operating state of the processor system comprises:
changing the operating state of the processor system from the low-power state to the normal-power state before the transaction layer packet is received from the hardware system at the second time instance.

13. The method of claim 11, wherein changing the operating state of the processor system comprises:
increasing a frequency at which the processor system operates.

14. The method of claim 11, wherein changing the operating state of the processor system comprises:
increasing a voltage of a clock that is used by the processor system to perform operations.

15. The method of claim 11, wherein changing the operating state of the processor system comprises:
switching a portion of the processor system from an off state to an on state.

16. The method of claim 11, wherein receiving the notification from the hardware system comprises:
receiving the notification from the hardware system via a Peripheral Component Internet Express (PCIe) WAKE #pin of the processor system at the first time instance.

17. The method of claim 11, wherein receiving the notification from the hardware system comprises:
at the first time instance, receiving the notification from the hardware system via a first connection that is included in a plurality of connections that connect a plurality of respective hardware systems to the processor system via a Boolean OR gate.

18. The method of claim 11, wherein the notification specifies the amount of time between the first time instance and the second time instance without specifying the second time instance.

19. A hardware system to reduce latency of changing an operating state of a processor from a low-power state to a normal-power state, the hardware system comprising:
memory; and
a processor system coupled to the memory, the processor system configured to:
based at least in part on receipt of a network packet via a network, prior to a transaction layer packet that is based at least in part on the network packet being provided to the processor by the hardware system, trigger a change of the operating state of the processor from the low-power state to the normal-power state by asynchronously providing a notification to the processor at a first time instance, the notification indicating that the transaction layer packet is to be provided to the processor at a second time instance that temporally follows the first time instance, the notification specifying a difference between the first time instance and the second time instance without including a second time stamp that indicates the second time instance, wherein the low-power state is configured to cause the processor to consume a first amount of power, and wherein the normal-power state is configured to cause the processor to consume a second amount of power that is greater than the first amount; and
cause the transaction layer packet to be processed in the normal-power state by providing the transaction layer packet to the processor at the second time instance.

20. The hardware system of claim 19, wherein the notification specifies the difference between the first time instance and the second time instance without including the second time stamp that indicates the second time instance and further without including a first time stamp that indicates the first time instance.

* * * * *